(12) United States Patent
Plate et al.

(10) Patent No.: US 9,657,472 B2
(45) Date of Patent: *May 23, 2017

(54) SMART TOILET SYSTEMS AND METHODS

(71) Applicant: Kohler Co., Kohler, WI (US)

(72) Inventors: Eric M. Plate, Plymouth, WI (US); Michael R. Bates, Kohler, WI (US); Fei Shen, Shanghai (CN); Xue Jiongjun, Shanghai (CN); Andy Zhu, Shanghai (CN); Michael Cao, Shanghai (CN); Li Ni, Shanghai (CN)

(73) Assignee: KOHLER CO., Kohler, WI (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/867,828

(22) Filed: Sep. 28, 2015

(65) Prior Publication Data
US 2016/0017585 A1    Jan. 21, 2016

Related U.S. Application Data

(63) Continuation of application No. 14/484,013, filed on Sep. 11, 2014, now Pat. No. 9,170,720, which is a
(Continued)

(51) Int. Cl.
*E03D 1/00* (2006.01)
*E03D 9/00* (2006.01)
*A47K 13/10* (2006.01)
*E03D 11/00* (2006.01)
*G06F 3/0484* (2013.01)
*H04R 1/02* (2006.01)
*A47K 13/24* (2006.01)
(Continued)

(52) U.S. Cl.
CPC .............. *E03D 9/00* (2013.01); *A47K 13/10* (2013.01); *A47K 13/24* (2013.01); *A47K 13/305* (2013.01); *E03D 5/105* (2013.01); *E03D 9/052* (2013.01); *E03D 9/08* (2013.01); *E03D 11/00* (2013.01); *E03D 11/02* (2013.01); *F21V 33/004* (2013.01); *G06F 3/04842* (2013.01); *G06F 3/165* (2013.01); *H04R 1/025* (2013.01); *H04R 1/028* (2013.01); *H04R 2201/02* (2013.01); *H04R 2430/01* (2013.01)

(58) Field of Classification Search
CPC ...................................................... E03D 1/00
USPC ..................................................... 4/300–442
See application file for complete search history.

(56) References Cited

U.S. PATENT DOCUMENTS 6,028,520 A    2/2000  Maehre
6,903,659 B2   6/2005  Vanderah et al.
(Continued)

OTHER PUBLICATIONS

Notification of International Search Report and Written Opinion dated May 14, 2014, 9 pages.
(Continued)

*Primary Examiner* — Lori Baker
(74) *Attorney, Agent, or Firm* — Foley & Lardner LLP

(57) ABSTRACT

A plumbing fixture includes a basin, a plumbing system configured to supply water to the basin, a processing circuit having a digital media interface, and a housing containing the plumbing system and the processing circuit. The housing includes a rear face having a section extending therefrom. The section extending from the housing includes a first face parallel to the rear face and a second face connecting the first face to the rear face. The second face includes ports allowing access to the digital media interface.

20 Claims, 16 Drawing Sheets

Related U.S. Application Data continuation of application No. PCT/US2014/012588, filed on Jan. 22, 2014.

(51) Int. Cl.
*A47K 13/30* (2006.01)
*F21V 33/00* (2006.01)
*E03D 5/10* (2006.01)
*E03D 9/052* (2006.01)
*E03D 9/08* (2006.01)
*E03D 11/02* (2006.01)
*G06F 3/16* (2006.01)

(56) References Cited

U.S. PATENT DOCUMENTS

| | | |
|---|---|---|
| 7,380,292 B1 | 6/2008 | Harris |
| 2011/0113540 A1 | 5/2011 | Plate et al. |
| 2014/0008346 A1 | 1/2014 | Zhu et al. |

OTHER PUBLICATIONS

Grobart, Sam, "Bells and Whistles Descent Upon the Throne," The New York Times, Oct. 12, 2011, 3 pages.
Notice of International Preliminary Report on Patentability issued Jul. 28, 2015 regarding PCT/US2014/012588.

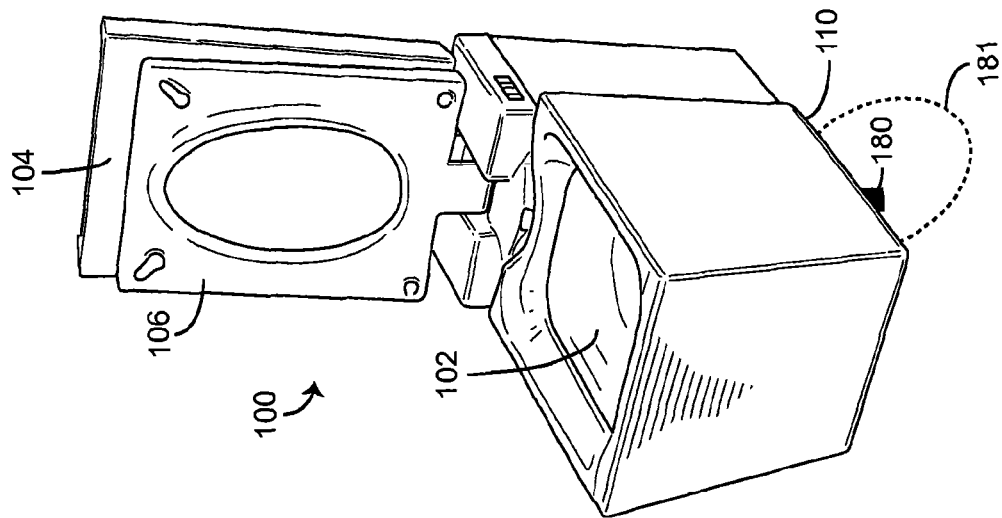
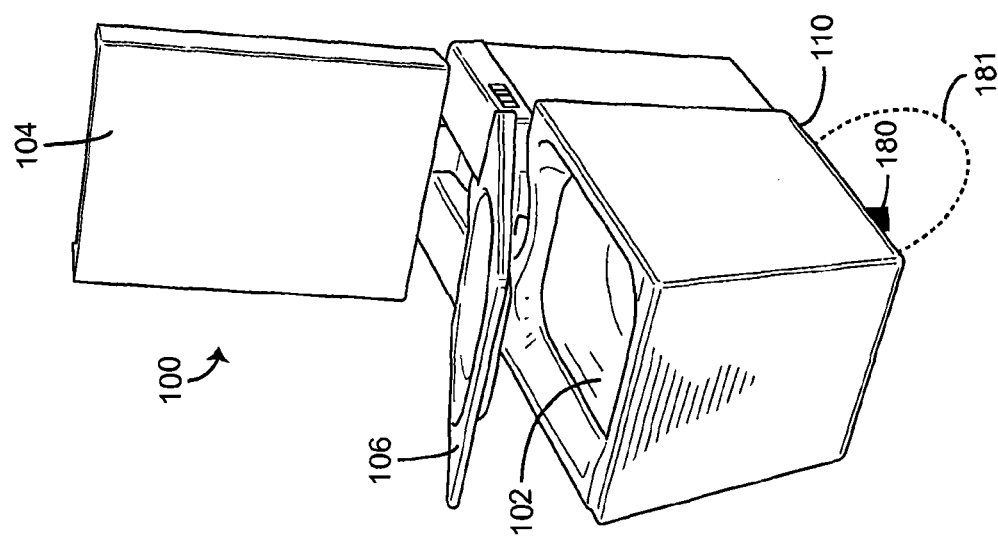
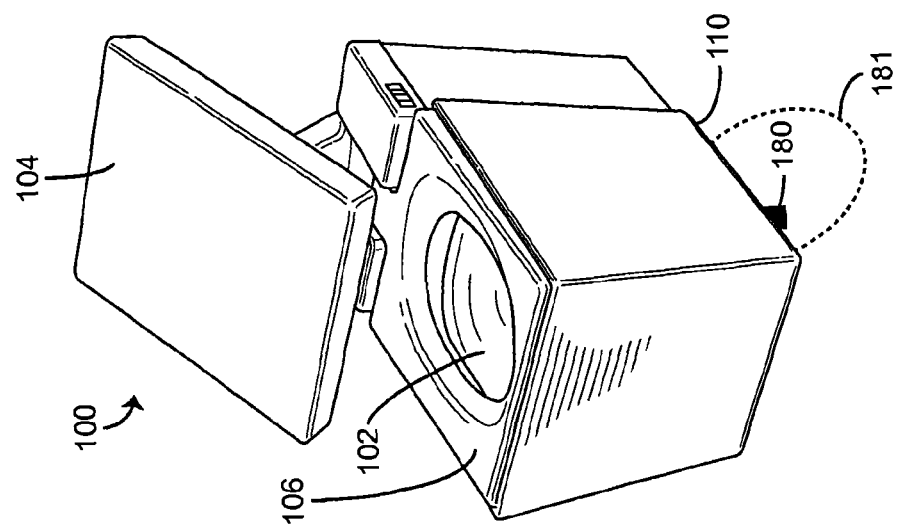

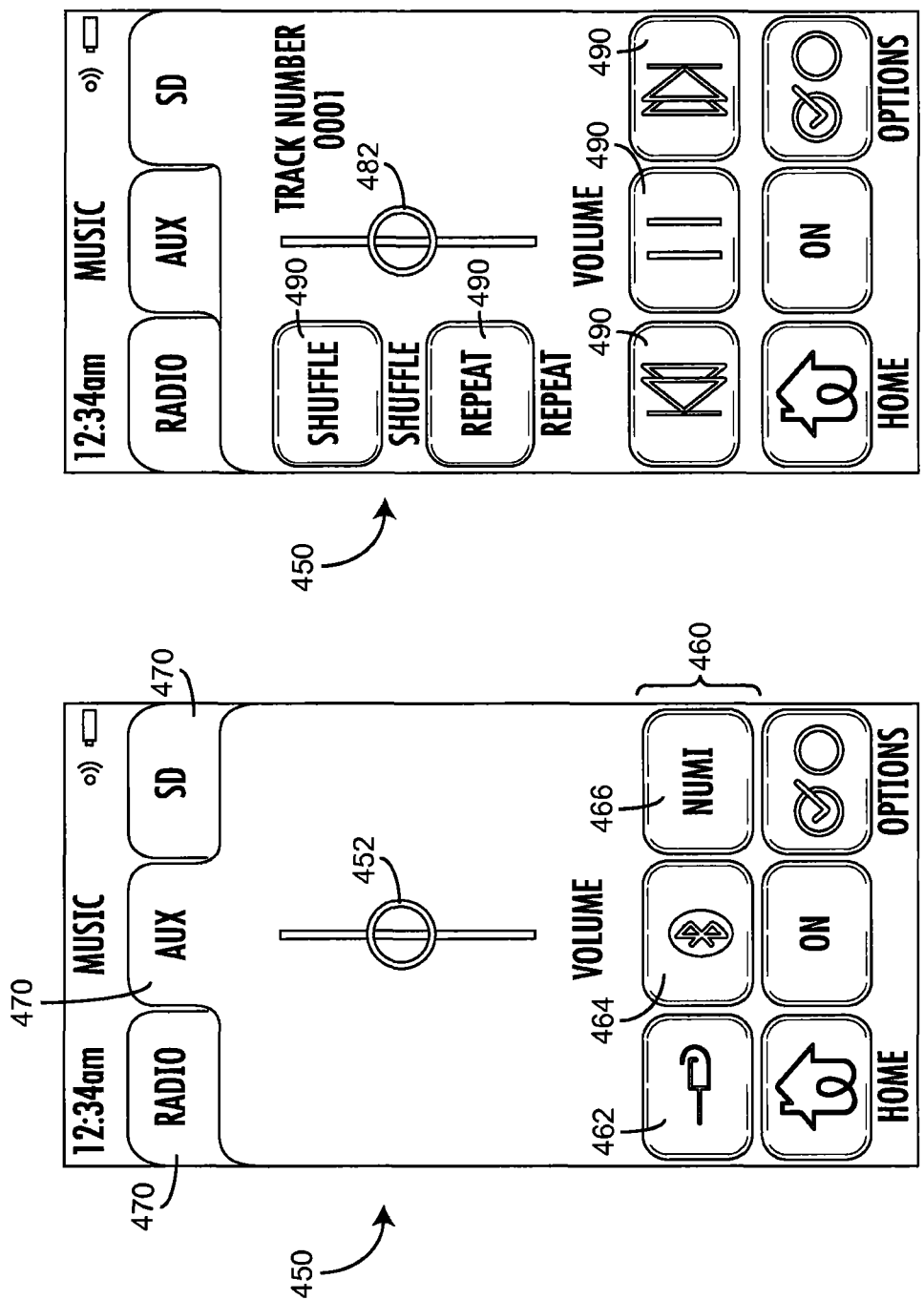

SMART TOILET SYSTEMS AND METHODS

CROSS-REFERENCE TO RELATED PATENT APPLICATIONS

This application is a continuation of U.S. patent application Ser. No. 14/484,013, filed Sep. 11, 2014, which is a continuation of International Patent Application No. PCT/US2014/012588, filed Jan. 22, 2014, which claims the benefit of and priority to U.S. Provisional Patent Application No. 61/755,863, filed Jan. 23, 2013. Each of these patent applications is incorporated by reference herein in its entirety.

BACKGROUND

The present invention relates to plumbing fixtures such as toilets and bidets. In particular, the present invention relates to electronically controlled plumbing systems having a plurality of customizable features which may be adapted to suit consumer preferences.

Conventional plumbing fixtures (e.g., toilets, bidets, etc.) may have a single mode of operation and one or more features essential to support that mode of operation. For example, a conventional toilet may include a basin and a plumbing system configured to supply water to the basin. The plumbing system may include several sub-elements (e.g., a water tank, a flush valve, a fill valve, etc.) all designed to support a single operational mode (e.g., flushing the toilet).

More advanced plumbing fixtures may include one or more supplemental features non-essential to the primary mode of operation. It is challenging and difficult to create advanced plumbing fixtures having such supplemental features without adversely impacting the user experience of the primary mode of operation.

SUMMARY

A plumbing fixture (i.e., smart toilet) is disclosed. The lighting element is capable of emitting light of a variety of different wavelengths and the processing circuit is configured to control the wavelength of the emitted light. The toilet may further include a speaker and an audio source. The first audio source is at least one of a radio receiver, a memory card reader, an auxiliary input, a USB connection, a wired networking device, and a wireless networking device. The plumbing fixtures disclosed herein are user operable through electronic sensors or via a user-operable remote controller.

One implementation of the present disclosure is a plumbing fixture including a basin, a plumbing system configured to supply water to the basin, a lighting element, and a processing circuit. The lighting element may be capable of emitting light of a variety of different wavelengths and the processing circuit may be configured to control the wavelength of the emitted light. In some embodiments, the lighting element is contained within a housing. The housing may include a translucent portion through which the emitted light to at least partially exit the housing via the translucent portion.

In some embodiments, the plumbing fixture further includes an input device. The processing circuit may be configured to control the wavelength or color of the emitted light based on a signal received from the input device. In some embodiments, the input device is one of a control panel on the plumbing fixture, a proximity sensor, and a remote receiver. In some embodiments, the proximity sensor includes one or more of an optical sensor, an ultrasonic sensor, a magnetic sensor, an electrostatic sensor, and a capacitive sensor.

In some embodiments, the plumbing fixture further includes a user-operable remote controller. The remote controller may be configured to interact with a remote receiver contained within the housing. The processing circuit may be configured to control the wavelength or color of the emitted light based on input received from a user via the remote controller. In some embodiments, the remote controller includes an electronic display, a user input device, and a remote processing circuit. The remote processing circuit may be configured to cause the electronic display to display a plurality of different color options corresponding to wavelengths or colors capable of emission by the lighting element, receive an input indicative of a user-selected color via the user input device, and transmit a signal to the remote receiver based on the input received via the user input device.

Another implementation of the present disclosure is a method for controlling light emitted from a plumbing fixture using a lighting element contained within a housing of the plumbing fixture and a processing circuit, the method including receiving a signal from an input device using the processing circuit, determining the color of light to emit using the processing circuit, and controlling the lighting element to produce light using the processing circuit. In some embodiments, the lighting element is capable of emitting light having a variety of different colors. The processing circuit may be configured to control the color of the emitted light. The input device may be at least one of a control panel on the plumbing fixture, a proximity sensor, and a remote receiver.

In some embodiments, the method further includes receiving a user input using a remote controller, receiving a transmission from the remote controller using the remote receiver, and sending a signal based on the user input to the processing circuit using the remote receiver. The remote controller may include an electronic display, a user input device, and a remote processing circuit configured to cause the electronic display to display a plurality of different color options corresponding to colors capable of emission by the lighting element, receive an input indicative of a user-selected color via the user input device, and transmit a signal to the remote receiver based on the input received via the user input device.

Another implementation of the present disclosure is a plumbing fixture including a basin, a plumbing system configured to supply water to the basin, a speaker, a first audio source, and a processing circuit. The processing circuit may be configured to receive a signal from the first audio source and control a sound emitted by the speaker based on the signal. In some embodiments, the first audio source is one of a radio receiver, a memory card reader, an auxiliary input, a USB connection, a wired networking device, and a wireless networking device. In some embodiments, the wireless networking device is a Bluetooth device or an IEEE 802.11 compliant device. In some embodiments, the processing circuit is configured to perform multiple audio control functions including modulating volume of the emitted sound, pausing an audio track, resuming playback of an audio track, and switching between audio tracks within an audio source.

In some embodiments, the plumbing fixture further includes two or more additional audio sources. The first audio source and the two or more additional audio sources as a group may include at least three of a radio receiver, a memory card reader, an auxiliary input, a USB connection, a wired networking device, and a wireless networking device. In some embodiments, the processing circuit is configured to select an audio source from the group of audio sources and control the sound emitted by the speaker based on the signal received from the selected audio source. The audio source may be selected based on input received from a user.

In some embodiments, the plumbing fixture further includes a remote receiver and a user-operable remote controller configured to communicate with the remote receiver. The processing circuit may be configured to control the sound emitted by the speaker based on input received from a user via the remote controller.

In some embodiments, the remote controller includes an electronic display, a user input device, and a remote processing circuit. The remote processing circuit may be configured to cause the electronic display to display first user interface including a plurality of selectable audio sources, receive an input indicative of a user-selected audio source via the user input device, and transmit a signal to the remote receiver based on the input received via the user input device. In some embodiments, the remote processing circuit is configured to cause the electronic display to display a second user interface. The second user interface may permit deselection of one or more of the plurality of selectable audio sources. Deselecting an audio source via the second user interface may prevent the deselected audio source from being displayed in the first user interface.

Another implementation of the present disclosure is a method for configuring a plumbing fixture having an independently movable lid, an independently movable seat, a front sensor, and a side sensor, the method including receiving a user input from at least one of a control panel on the plumbing fixture and a remote receiver, determining, using a processing circuit and based on the user input, whether to utilize the front sensor or the side sensor for initiating movement of the lid or seat between the open position and the closed position, and configuring the processing circuit to move the lid or seat utilizing a sensor determined by the processing circuit.

In some embodiments, the method includes receiving a second user input from at least one of a control panel on the plumbing fixture and a remote receiver. The method may also include determining, using the processing circuit and the second user input, whether to initiate movement of the lid, the seat, or both the lid and the seat when a user is detected by the side sensor. The method may further include configuring the processing circuit to move the lid, the seat, or both the lid and the seat when a user is detected by the side sensor based on a determination of the processing circuit.

In some embodiments, the method further includes receiving a second user input specifying a detection distance from at least one of a control panel on the plumbing fixture and a remote receiver, determining, using the processing circuit and the second user input, a detection distance, and configuring the processing circuit, based on a determination of the processing circuit, to initiate movement of the lid or seat between the open position and the closed position when a user is detected by the front sensor at the specified detection distance.

In additional embodiments, the method further includes receiving a second user input for disabling at least one of the front sensor and the side sensor, determining, using the processing circuit and the second user input, which of the front sensor and the side sensor to disable, and disabling, using the processing circuit and a determination of the processing circuit, at least one of the front sensor and the side sensor.

Another implementation of the present disclosure is a method for controlling sound emitted from a plumbing fixture using a speaker contained within a housing of the plumbing fixture and a processing circuit, the method including receiving a signal from an audio source using the processing circuit and controlling a sound emitted by the speaker based on the signal using the processing circuit. In some embodiments, the processing circuit is configured to receive a signal from a first audio source and control the sound emitted by the speaker based on the signal, wherein the first audio source is one of a radio receiver, a memory card reader, an auxiliary input, a USB connection, a wired networking device, and a wireless networking device. Controlling a sound emitted by the speaker using the processing circuit may include performing at least one of an audio control function including modulating a volume of the emitted sound, pausing an audio track, resuming playback of an audio track, and switching between audio tracks within an audio source.

In some embodiments, the method further includes receiving a user input signal from an input device using the processing circuit and controlling a sound emitted by the speaker using the processing circuit and based on the signal from the input device. The input device may be at least one of a control panel on the plumbing fixture, a proximity sensor, and a remote receiver.

In some embodiments, the method further includes receiving a user input using a remote controller, receiving a transmission from the remote controller using the remote receiver, and sending the user input signal based on the user input to the processing circuit using the remote receiver. The remote controller may include an electronic display, a user input device, and a remote processing circuit configured to cause the electronic display to display a plurality of different options corresponding to at least one of modulating a volume of the emitted sound, pausing an audio track, resuming playback of an audio track, switching between audio tracks within an audio source, and selecting an audio source, receive an input indicative of a user-selected option via the user input device, and transmit a user input signal to the remote receiver based on the input received via the user input device.

In further embodiments, the method also includes switching between the first audio source and a second audio source using the control circuit. The second audio source may include at least three of a radio receiver, a memory card reader, an auxiliary input, a USB connection, a wired networking device, and a wireless networking device.

In some embodiments, the method further includes receiving a proximity signal from a sensor using the processing circuit, determining whether a user is approaching the plumbing fixture based on the proximity signal from the sensor using the processing circuit, and controlling the speaker to play music based on the signal from the audio source when it is determined that a user is approaching the plumbing fixture.

In additional embodiments, the method further includes receiving a user input signal from one or more of a control panel on the plumbing fixture, a proximity sensor, and a remote receiver. The method may also include selecting, using the processing circuit and based on the user input signal, the audio source from a group of audio sources including two or more of a radio receiver, a memory card reader, an auxiliary input, a USB connection, a wired networking device, and a wireless networking device. The method may further include controlling, using the processing circuit, the sound emitted by the speaker based on the signal received from a selected audio source.

In some embodiments, the method further includes receiving a user input using a remote controller, receiving a transmission from the remote controller using the remote receiver, and sending the user input signal based on the user input to the processing circuit using the remote receiver. The remote controller may include an electronic display, a user input device, and a remote processing circuit. The remote processing circuit may be configured to cause the electronic display to display a plurality of different options corresponding to selecting an audio source, receive an input indicative of a user-selected option via the user input device, and transmit a user input signal to the remote receiver based on the input received via the user input device. The method may further include displaying a first user interface on the remote controller. The first user interface may include a display of a plurality of selectable audio sources, and receiving the user input using the remote controller may include receiving a user selection using the first user interface. The method may further include displaying a second user interface on the remote controller. The second user interface may include a display of a plurality of selectable audio sources. The second user interface may permit deselection of one or more of the plurality of selectable audio sources, wherein deselecting an audio source via the second user interface prevents the deselected audio source from being displayed in the first user interface.

Another implementation of the present disclosure is a plumbing fixture including a basin, a plumbing system configured to supply water to the basin, and a processing circuit. The processing circuit may be configured to receive an electronic input from a plurality of input sources and control operation of the plumbing fixture based on the electronic input. The input sources may include a USB connection, a memory card reader, an auxiliary input, and a radio receiver.

In some embodiments, the plumbing fixture further includes a housing containing the plumbing system and the processing circuit. The housing may include ports allowing access to the memory card reader and the USB connection. The ports may allow for connecting input devices to the memory card reader and the USB connection. In some embodiments, the housing includes a rear face having a section extending therefrom. The section extending from the housing may include a first face and a second face, wherein the first face is parallel to the rear face and wherein the second face connects the first face to the rear face. The ports may define openings in the second face. In some embodiments, the second face includes a speaker opening configured to allow sound emitted from an internal speaker to exit the housing.

Another implementation of the present disclosure is a plumbing fixture including a basin having a lid, a seat, a sensor, and a processing circuit. The lid and seat may be independently movable between an open position and a closed position. The processing circuit may be configured to receive a signal from the sensor and cause the lid and seat to move between the open position and the closed position based on the signal. In some embodiments, the processing circuit is configured to cause movement of only the lid, only the seat, and both the lid and the seat between the open position and the closed position. In some embodiments, the processing circuit is configured to receive an input from a user indicating whether to cause movement of only the lid, only the seat, or both the lid and the seat. In some embodiments, the sensor is configured to detect the presence of a user within a detection region near the plumbing fixture. The sensor may be positioned to detect a foot of a user within a detection region beside the plumbing fixture. For example, the sensor may be conveniently positioned to detect a user's foot or leg to the side of the plumbing fixture. Advantageously, such sensor placement may improve the functionality (e.g., accuracy, precision, responsiveness, ergonomics, etc.) of the lid and seat positioning system when the plumbing fixture is installed in a relatively small room. The side sensor may supplement or replace other proximity or distance sensors.

Another implementation of the present disclosure is a method for raising and lowering features of a plumbing fixture having an independently movable lid and an independently movable seat, the method including detecting a user using a sensor, receiving a signal from the sensor using a processing circuit, and causing at least one of the lid and the seat to move between an open position and a closed position based on the signal and using the processing circuit. The processing circuit may be configured to cause movement of only the lid, only the seat, and both the lid and the seat between the open position and the closed position.

In some embodiments, the method further includes receiving a user input using the processing circuit and determining, using the processing circuit, whether to cause movement of only the lid, only the seat, or both the lid and the seat. Detecting a user using a sensor may include detecting a foot of a user within a detection region beside the plumbing fixture.

Another implementation of the present disclosure is a plumbing fixture including a basin having a lid and a seat, wherein the lid and seat are movable between an open position and a closed position. The plumbing fixture may further include a front sensor, a side sensor, and a processing circuit. In some embodiments, the processing circuit is configured to receive an input specifying whether to utilize the front sensor or the side sensor for initiating movement of the lid or seat between the open position and the closed position. In some embodiments, the lid and seat are independently movable between the open position and the closed position, and the processing circuit is configured to receive an input specifying whether to initiate movement of the lid, the seat, or both the lid and the seat when a user is detected by the side sensor. In some embodiments, the processing circuit is configured to receive an input specifying a detection distance, wherein specifying a detection distance configures the processing circuit to initiate movement of the lid or seat between the open position and the closed position when a user is detected by the front sensor at the specified detection distance. In further embodiments, the processing circuit is configured to receive an input disabling the front sensor and the side sensor.

Another implementation of the present disclosure is a method of configuring a power conservation schedule for an electronic plumbing fixture, the method including collecting user activity data over a cyclical period. The period may be divided into discrete time intervals. The method may further include marking each time interval with a first designation if user activity occurs during the time interval and with a second designation if user activity does not occur during the time interval, receiving a minimum threshold, and scheduling the plumbing fixture to enter a power conservation mode during a time interval if (a) the time interval is part of a group of consecutive time intervals marked with the second designation and (b) the group includes a number of time intervals greater than or equal to the minimum threshold. The method may further include scheduling the plumbing fixture to enter a normal mode of operation during all other time intervals.

BRIEF DESCRIPTION OF THE FIGURES

FIG. 2A is a drawing of the plumbing fixture with the lid partially between a closed position and an open position, according to an exemplary embodiment.

FIG. 2B is a drawing of the plumbing fixture with the lid fully in the open position and the seat partially between the closed position and the open position, according to an exemplary embodiment.

FIG. 2C is a drawing of the plumbing fixture with both the lid and the seat in the open position, according to an exemplary embodiment.

FIG. 9C is a drawing of a user interface for selecting between multiple auxiliary audio devices, according to an exemplary embodiment.

FIG. 9D is a drawing of a user interface for controlling track selection and playback of audio data received from a memory card audio source, according to an exemplary embodiment.

DETAILED DESCRIPTION

Figure 1A:
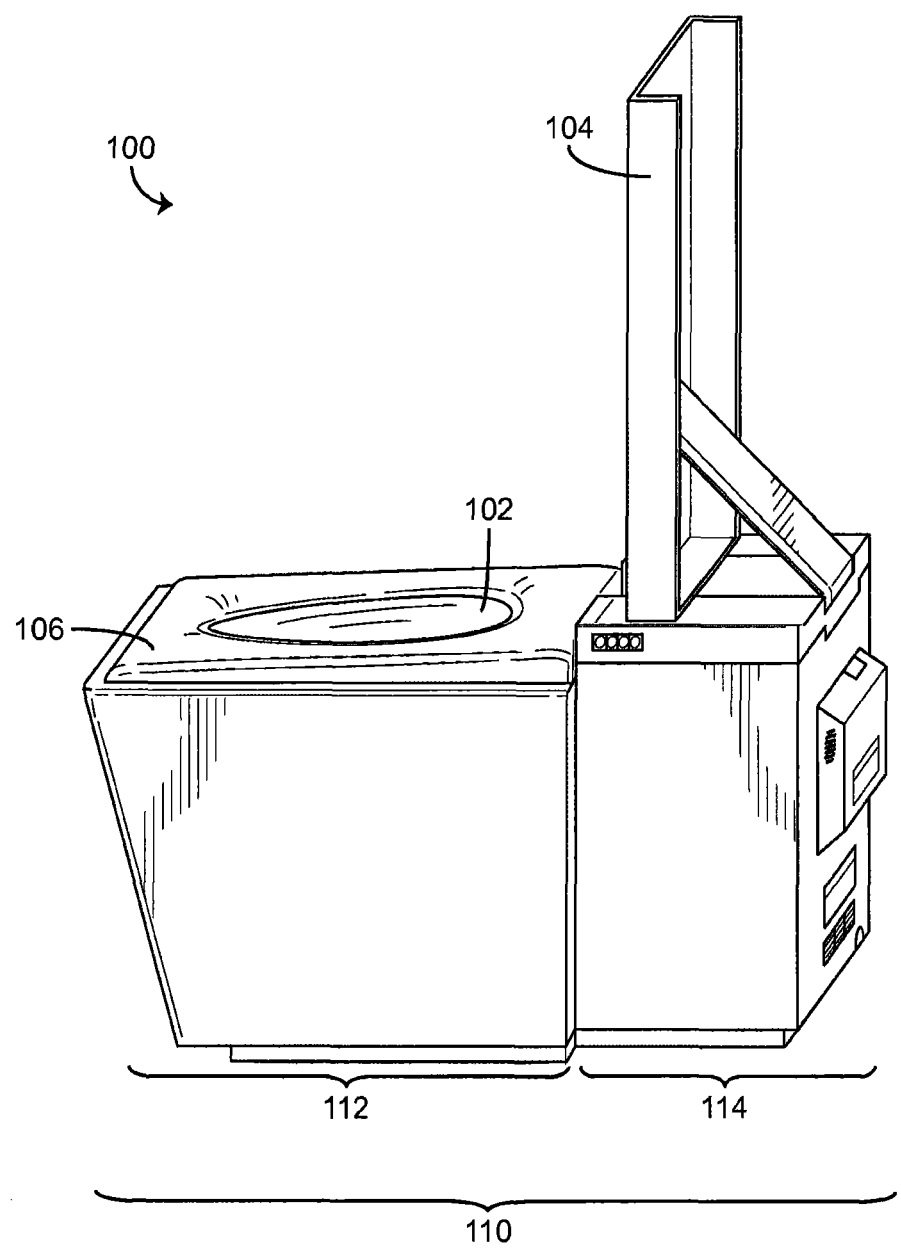
FIG. 1A is a drawing of an electronic plumbing fixture including a basin, a lid, a seat, and a housing, according to an exemplary embodiment.

Referring to FIG. 1A, a plumbing fixture 100 is shown, according to an exemplary embodiment. Fixture 100 is shown to include a basin 102, a lid 104, a seat 106, and a housing 110. Fixture 100 may receive a fluid input (e.g., water) from a fluid supply line and may deliver the fluid to basin 102 via an internal fluid connection (not shown). Fixture 100 may receive electrical energy from an external or internal energy source. For example, fixture 100 may connect to a standard residential power outlet (e.g., 120 V 60 Hz), a power generator, or other power source (e.g., batteries, capacitors, etc.).

In some embodiments, fixture 100 functions as a toilet, using the fluid to flush, rinse, or otherwise clean basin 102. Fixture 100 may provide a variety of flushing options configured to carry out the flushing process. For example, one flushing option may clear basin 102, automatically wash basin 102, and then refill basin 102 for subsequent use. Other flushing options may automatically clean basin 102, sanitize basin 102, or initiate a process to reduce or eliminate odor. Fixture 100 may provide one or more flushing options configured to use various amounts of water or power during the flushing cycle. In some embodiments, fixture 100 may include a bidet wand, a cleaning element, a fan, or other optional features. In some embodiments, fixture 100 functions as a bidet, delivering the fluid to the bidet wand. Fixture 100 may provide a variety of bidet control options including user-customizable spray patterns and an adjustable spray pressure, temperature, or position. Fixture 100 may automatically clean and sanitize the bidet wand using an internal ultraviolet sanitizing light. In some embodiments fixture 100 functions as a combination toilet and bidet, providing both functionalities.

Fixture 100 is shown to include a housing 110. Housing 110 may enclose (e.g., surround, encapsulate, contain, etc.) some or all of the other components of fixture 100 (e.g., plumbing components, electrical components, mechanical components, etc.). Housing 110 may provide support for other components, thereby allowing such components to be positioned for proper operation of fixture 100 as described herein. In some embodiments, housing 110 may protect the internal components from external sources of damage (e.g., physical damage, chemical damage, electrical damage, etc.). In some embodiments, housing 110 may be a single shell encapsulating all of fixture 100. In other embodiments, housing 110 may include multiple shells. For example, FIG. 1A shows housing 110 divided into multiple sections. A frontal housing section 112 is shown supporting basin 102. A rear housing section 114 is shown surrounding another portion of fixture 100.

Figure 1B:
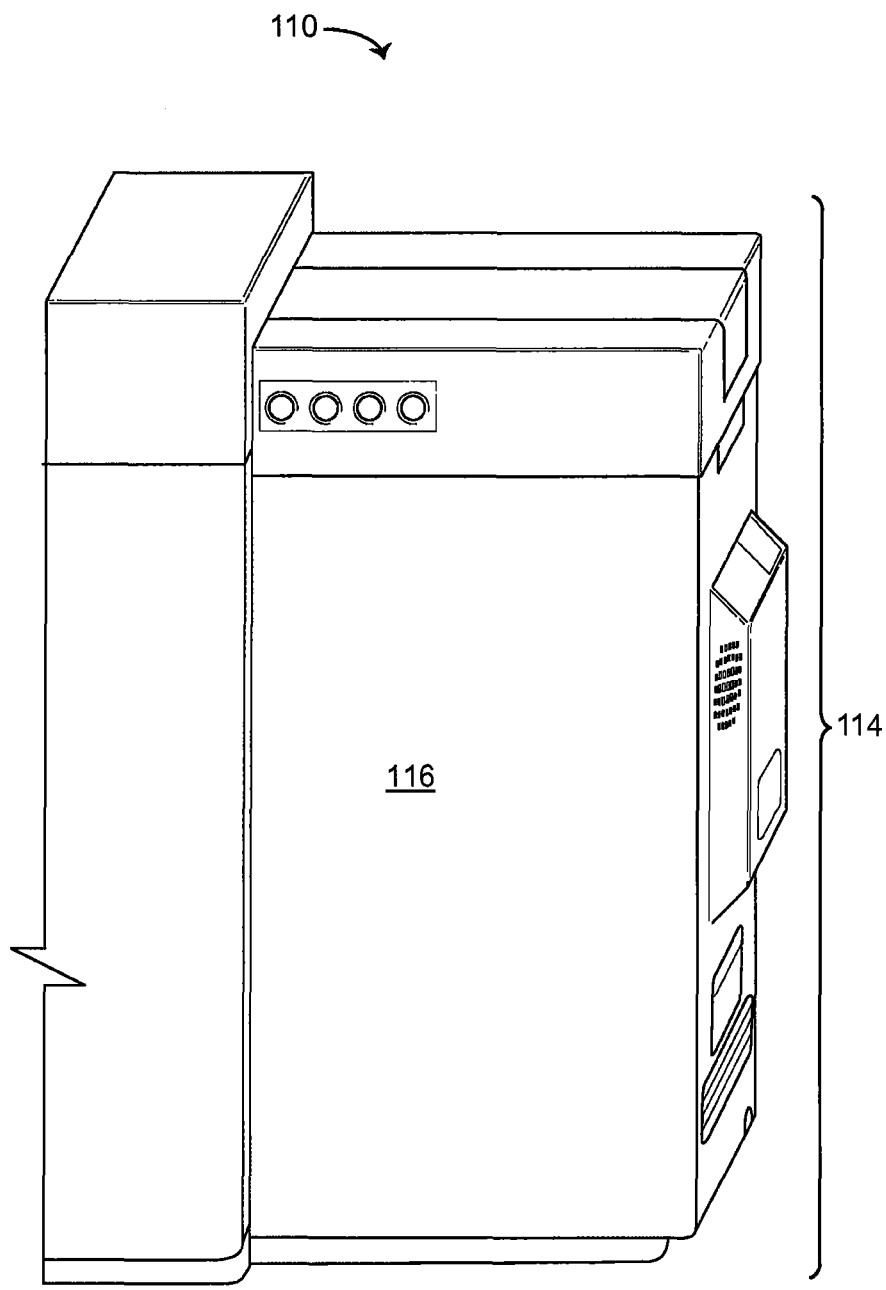
FIG. 1B is another view of the plumbing fixture of FIG. 1A. The housing includes a translucent portion through which light emitted by an internal lighting element may exit the housing, according to an exemplary embodiment.

Referring now to FIG. 1B, housing 110 is shown to include a translucent window 116, according to an exemplary embodiment. Window 116 may be positioned on one or both sides of rear section 114. In alternative embodiments, one or more windows may be located or sized differently. An internal lighting element (e.g., lighting element 160) may be positioned within housing 110 in proximity to window 116. Light emitted from lighting element 160 may exit housing 110 at least partially through window 116. The material or materials of window 116 may partially scatter or diffuse the light, thereby producing an illuminated glow emanating from housing 110. Window 116 may be configured to allow some light emitted from lighting element 160 to pass through window 116 while obstructing or obscuring a view of the other components of fixture 100 contained within housing 110.

Figure 1C:
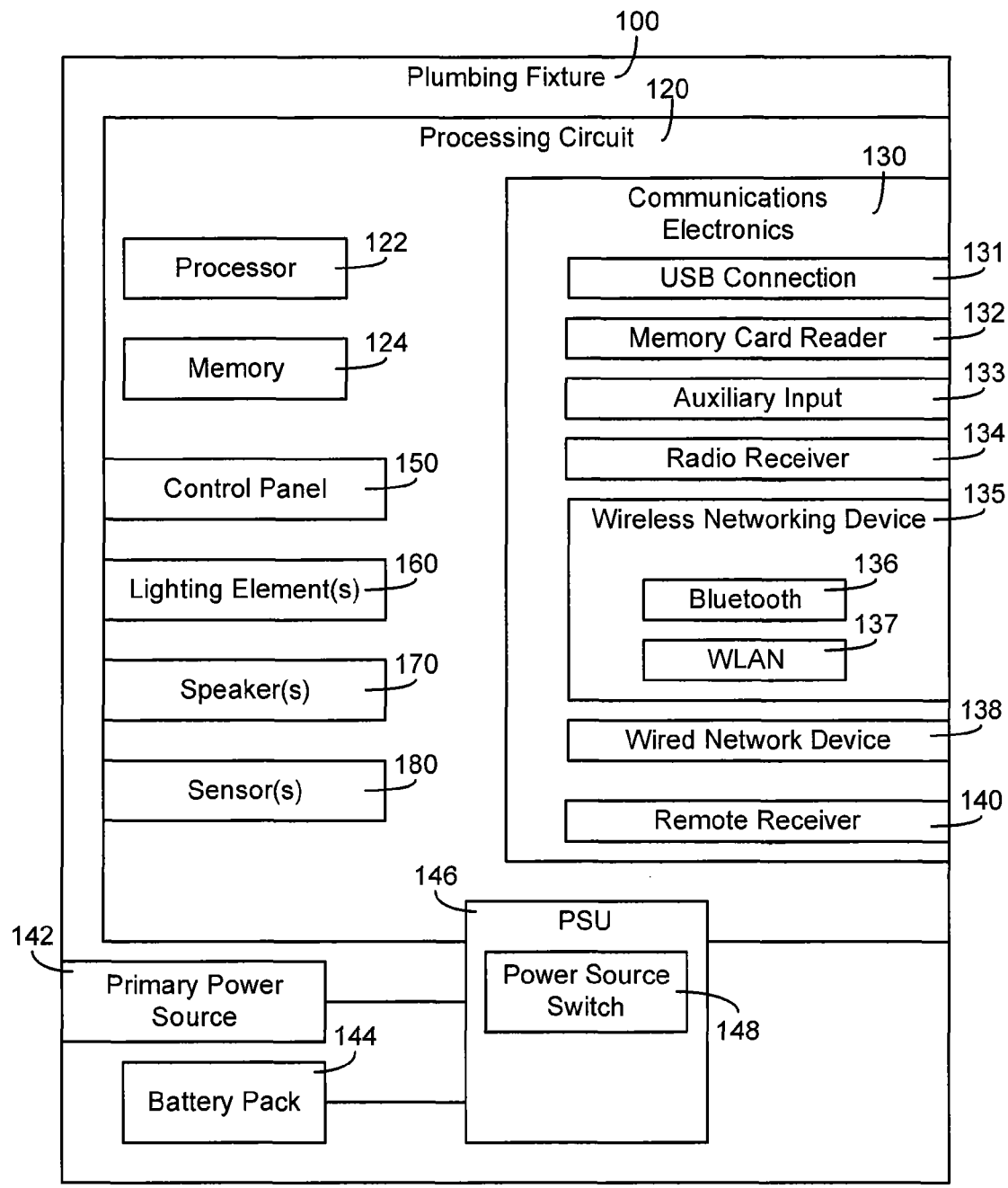
FIG. 1C is a block diagram of the electrical components of the plumbing fixture including a processing circuit, data connections, a remote receiver, a control panel, a lighting element, a speaker, and a sensor, according to an exemplary embodiment.

Referring now to FIG. 1C, a block diagram illustrating the electrical components of fixture 100 is shown, according to an exemplary embodiment. Fixture 100 is shown to include a processing circuit 120 including a processor 122 and memory 124. Fixture 100 is further shown to include a set of communications electronics 130, a remote receiver 140, a control panel 150, a lighting element 160, a speaker 170, and a sensor 180.

In operation, fixture 100 may receive an input (e.g., an electronic data signal, a user-specified control action, an operation instruction, etc.) via remote receiver 140, control panel 150 or sensor 180. Processing circuit 120 may interpret the input and initiate one or more control actions (e.g., flushing basin 102, extending the bidet wand, activating lighting element 160, activating electronics driving speaker 170, etc.) based on the input. For example, processing circuit 120 may receive a signal from sensor 180 and determine, based on the signal, that a user is present. Processing circuit 120 may cause speaker 170 to play music when the user is present. The music may be selected from a plurality of data sources including memory 124, Universal Serial Bus (USB) connection 131, memory card reader 132, auxiliary input 133, radio receiver 134, or any other of communications electronics 130. Processing circuit 120 may also cause lighting element 160 to illuminate upon determining that a user is present. Lighting element 160 may emit a variety of different colors, combinations, or patterns based on input received from remote receiver 140, control panel 150, sensor 180 or any of communications electronics 130.

Still referring to FIG. 1C, processing circuit 120 is shown to include a processor 122 and memory 124. Processor 122 may be implemented as a general purpose processor, an application specific integrated circuit (ASIC), one or more field programmable gate arrays (FPGAs), a CPU, a GPU, a group of processing components, or other suitable electronic processing components. Memory 124 may include one or more devices (e.g., RAM, ROM, Flash memory, hard disk storage, etc.) for storing data and/or computer code for completing and/or facilitating the various processes, layers, and modules described in the present disclosure. Memory 124 may include volatile memory or non-volatile memory. Memory 124 may include database components, object code components, script components, or any other type of information structure for supporting the various activities and information structures described in the present disclosure. For example, memory 124 may include instructions for interpreting (e.g., via processor 122) the various inputs received from communications electronics 130, remote receiver 140, control panel 150, and sensor 180. Memory 124 may further include instructions for activating lighting element 160, causing sound to be emitted from speaker 170, or for initiating a flushing, sanitizing, or cleaning process.

Still referring to FIG. 1C, fixture 100 may further include one or more communications electronics 130. Communications electronics 130 may include a USB connection 131, a memory card reader 132, an auxiliary input 133, a radio receiver 134, a wireless networking device 135, a wired networking device 138, or a remote receiver 140. Communications electronics 130 may allow fixture 100 to communicate with one or more mobile data sources such as a USB memory device, a memory card, a portable hard drive, or a mobile media device (e.g., a portable audio playback device). Communications electronics 130 may also allow fixture 100 to communicate with a wireless networking device (e.g., a wireless router, cell phone, wireless-enabled computer, laptop, tablet, or other wireless device) or a wired networking device (e.g., via an Ethernet cable, a SATA cable, USB cable, or other physical data connection).

In some embodiments, communications electronics 130 enable fixture 100 to send or receive data such as electronic media (e.g., audio or video files, audio or video streams, pictures, etc.), configuration information (e.g., system settings, user preferences, etc.), or operating commands (e.g., initiating the flushing process, activating lighting element 160, emitting sound from speaker 170, etc.). Advantageously, communications electronics 130 may enable fixture 100 to receive updates such as improved operating system software, updated firmware, user interface upgrades, or other product alterations or modifications. In addition to the devices shown in FIG. 1C, communications electronics 130 may include one or more supplemental wired or wireless interfaces (e.g., jacks, antennas, transmitters, receivers, transceivers, wire terminals, Ethernet ports, WiFi transceivers, etc.) for conducting data communications with local or remote devices or systems.

Still referring to FIG. 1C, fixture 100 may further include a remote receiver 140. Remote receiver 140 may allow fixture 100 to communicate with a remote control device. Remote receiver 140 may be a radio receiver or other wireless receiver capable of communicating with a remote transmitter. In some embodiments, remote receiver 140 may be combined with radio receiver 134. In other embodiments, remote receiver 140 and radio receiver 134 are separate components. Remote receiver 140 may allow fixture 100 to wirelessly receive data such as electronic media (e.g., audio or video data), configuration information, or operating commands. In some embodiments, remote receiver 140 may function as a two-way communications channel, thereby enabling fixture 100 to both send and receive information. In other embodiments, remote receiver 140 may be capable of only receiving information. Remote receiver 140 may be configured to receive data from or exchange information with a user-operable remote transmitter such as remote control device 200, described in greater detail in reference to FIGS. 7-11.

Still referring to FIG. 1C, fixture 100 may further include a control panel 150. Control panel 150 may be operated by a user (e.g., via physical interaction) to control one or more functions of fixture 100. For example, control panel 150 may include a button for flushing basin 102, for raising or lowering lid 104 or seat 106, for activating a cleaning process, or for initiating other functions of fixture 100. In some embodiments, control panel 150 provides an alternate mechanism for operating fixture 100 in addition to remote control device 200. Control panel 150 may duplicate some or all of the control functions achievable via remote control device 200 or may provide additional control action not achievable via remote control device 200. In some embodiments, control panel 150 may be positioned physically on an exterior surface of fixture 100. Control panel 150 may include one or more user-operable buttons, switches, keys, dials, or other input devices. Control panel 150 may use touch-sensitive technology (e.g., capacitive touch, piezo-electric, etc.) field-of-effect technology (e.g., projected capacitive, electrostatic, etc.) or any other technology for receiving an input.

Still referring to FIG. 1C, fixture 100 may further include a lighting element 160. Lighting element 160 may be a light source such as a light emitting diode (LED), an incandescent filament, a fluorescent tube, or any other electroluminescent device. In some embodiments, lighting element 160 may include multiple light sources (e.g., multiple LEDs, an LED strip, a fluorescent tube in combination with one or more LEDs, etc.). Lighting element 160 may be positioned within housing 110 such that light emitted from lighting element 160 exits housing 110 at least partially through window 116.

Lighting element 160 may be capable of emitting light at a variety of different wavelengths. For example, lighting element 160 may emit infrared light, light having a wavelength within the visible spectrum, or ultraviolet light. In some embodiments, lighting element 160 may be capable of emitting many different colors by controlling the wavelength of the emitted light. In other embodiments, lighting element 160 may emit multiple different wavelengths of light concurrently and combine such light (e.g., internally or externally) into a superimposed output. For example, lighting element 160 may include three LEDs, each of which is configured to emit a primary color of light. By selectively activating, deactivating, or controlling the intensity of each primary color LED, lighting element 160 may emit any color of visible light. Lighting element 160 may include driving circuitry configured to controllably adjust electrical signals provided to the LED, LEDs, or other lighting elements.

Lighting element 160 may be controlled by processing circuit 120 based on input received from communications electronics 130, remote receiver 140, control panel 150, or sensor 180. A user may select (e.g., directly via control panel 150, remotely via remote control device 200, etc.) the color of light emitted by lighting element 160. In some embodiments, the color of the emitted light may be varied based on the time of day, day of the week, month, or any other unit of time. Processing circuit 120 may be programmed to cycle lighting element 160 through a set of colors or to emit a constant color until further instructions are received. The colors emitted by lighting element 160 may be user-specified or automatically selected (e.g., based on a control algorithm which does not require user inputs for each session of use).

In some embodiments, for example, a user may select the conditions under which lighting element 160 is activated. Processing circuit 120 may receive configuration settings from a user and store the configuration settings in memory 124. The configuration settings may cause processing circuit 120 to activate lighting element 160 upon the occurrence of a specified event (e.g., a time of day, a signal from sensor 180, an input received from one of communications electronics 130, remote receiver 140, etc.). For example, processing circuit 120 may be programmed to activate lighting element 160 if the time of day is between specified hours (e.g., between 10 P.M. and 6 A.M.) and if sensor 180 produces a specified signal (e.g., indicating the presence of a nearby user). In this way, fixture 100 may be configured to function as a night-light which automatically activates when a user enters the bathroom at night.

In some embodiments, lighting element 160 may be activated in accordance with configuration settings relating to a specific user profile. Fixture 100 may support multiple user profiles, each of which may define the times, colors, patterns, or activation triggers for lighting element 160. In some embodiments, user profiles may be discrete (e.g., active at discrete times) whereas in other embodiments two or more user profiles may be concurrently active. In some embodiments, fixture 100 may automatically select a user profile based on a predefined schedule or based on input received from one or more of sensors 180. For example, processing circuit 120 may use input from sensors 180 to identify a user and activate a user profile corresponding to the identified user.

Still referring to FIG. 1C, fixture 100 may further include a speaker 170. Speaker 170 may be an electroacoustic transducer which produces sound in response to an electrical audio signal input. Speaker 170 (e.g., and an amplifier connected thereto) may be positioned within housing 110. In some embodiments, multiple speakers 170 may be positioned within housing 110. Speaker 170 may be activated by processing circuit 120 based on an audio signal received from one of communications electronics 130 or remote receiver 140. In some embodiments, a user may select between multiple potential audio sources in determining which audio signal to communicate to speaker 170. For example, a user may be able to choose from audio signals received from radio receiver 134 (e.g., AM or FM radio signals) or from auxiliary input 133 (e.g., a 3.5 mm stereo input port, multi-channel audio inputs, optical audio input, etc.).

In some embodiments, fixture 100 may include an audio decoder (e.g., an audio codec, decompression module, or filter) capable of reading audio files or audio streams and translating such information into an audio signal for communication to speaker 170. For example, fixture 100 may receive an audio input in the form of an encoded audio file (e.g., MP3, AC3, WMA, etc.) from USB connection 131 or memory card reader 132. Processing circuit 120 may receive the encoded audio data and create an audio signal based on such data. In some embodiments, fixture 100 may be configured to perform one or more audio control functions when receiving audio data from specified communications electronics 130. For example, fixture 100 may be configured to analyze the audio data stored on a USB memory device, external hard drive, or removable memory card (e.g., a SanDisk memory card) and recognize discrete audio tracks stored on the device (e.g., separate files, songs, albums, etc.). Fixture 100 may be configured to control the volume of the emitted sound, pause an audio track, resume playback of an audio track, or switch between audio tracks within an audio source. These control activities may be selected or communicated based on inputs received from remote control device 200.

In some embodiments, fixture 100 may include a Bluetooth device 136 capable of receiving audio data wirelessly from a remote Bluetooth source. Bluetooth device 136 may be paired or linked with another Bluetooth-capable device via an interactive menu accessible through remote control device 200. For example, a user may enable Bluetooth device 136 and enter a Bluetooth pin code via remote control device 200. The user may then enter the same Bluetooth pin into the remote Bluetooth source to communicably link the two devices. Once paired or linked, the remote Bluetooth source may provide fixture 100 with audio data (e.g., an audio signal, stream, encoded audio file, etc.) which may be communicated to speaker 170 for translation into audible sound.

Still referring to FIG. 1C, fixture 100 may further include primary power source 142. In some embodiments primary power source 142 is a wired connection to an external power source. For example, primary power source 142 may be power from a standard residential or commercial power source (e.g., a 120V 60 Hz AC power supply). Fixture 100 may be plugged-in to a standard residential electrical outlet which serves as primary power source 142.

Still referring to FIG. 1C, fixture 100 may further include battery pack 144. Battery pack 144 may be inserted and/or removed from fixture 100 as described in more detail with respect to FIG. 4. The battery pack 144 may contain one or more batteries and may arrange the batteries in series, in parallel, or in both configurations. The battery pack 144 may function as a voltage stack, allowing multiple batteries to be combined into a larger battery with a greater terminal voltage. Battery pack 144 may serve as a backup power supply for fixture 100. Advantageously, the backup power supply may allow normal operation of fixture 100 (e.g., electronic, "push button," remote, automatic, etc.) to continue in the event of a power failure. This functionality, among other features, distinguishes fixture 100 from typical "smart toilets" which revert to manual operation (e.g., a pull cord, manual flush handle, etc.) in the event of a power failure.

Still referring to FIG. 1C, fixture 100 may further include power supply unit (PSU) 146. PSU 146 may receive power from a power source (e.g., primary power source 142 and/or battery pack 144). In some embodiments, PSU 146 transforms (e.g., the voltage of the power source), converts (e.g., from alternating current to direct current), or otherwise alters the power from a power source. PSU 146 may provide power to the components of fixture 100. In some embodiments, PSU 146 functions autonomously. In other embodiments, processing circuit 120 may control PSU 146. In further embodiments, PSU 146 performs other functions such as providing short circuit protection, overpower protection, overvoltage protection, undervoltage protection, overcurrent protection, over temperature protection, or other support to the components of fixture 100.

In some embodiments, PSU 146 includes power source switch 148. PSU 146 may use power source switch 148 to switch between primary power source 142 and battery pack 144 to power the components of fixture 100. In some embodiments, PSU 146 and/or power switch 148 automatically switches between primary power source 142 and battery pack 144. For example, upon detecting a power outage (e.g., no power is available from primary power source 142), PSU 146 and/or power source switch 148 may automatically begin drawing power from battery pack 144. In some embodiments, when the power outage ends (e.g., power is available from primary power source 142 again), PSU 146 and/or power source switch 148 automatically switches to drawing power from primary power source 142. In other embodiments, PSU 146 and/or power source switch 148 may be controlled by processing circuit 120. In some embodiments, PSU 146 and/or power switch 148 allow for the recharging of battery pack 144. In further embodiments, a depleted battery pack 144 may be switch for a charged battery pack 144 as explained with reference to FIG. 4.

Referring now to FIGS. 2A-2C, fixture 100 may further include a sensor 180. Sensor 180 may be a proximity sensor (e.g., optical, projected capacitive, a magnetic, electrostatic, thermal, ultrasonic, etc.) capable of detecting the presence of a user or an object in a detection region near fixture 100. Sensor 180 may be located (e.g., positioned, attached, mounted) on or beneath a surface or edge of fixture 100. As shown in FIG. 2A, sensor 180 may be secured to an underside of housing 110 near a side of fixture 100. In some embodiments, sensor 180 may be positioned such that an optical path (e.g., a line of sight) exists between sensor 180 and the detection region. In embodiments in which sensor 180 does not rely on optical detection means, sensor 180 may be concealed behind an optically opaque surface. In some embodiments, sensor 180 may include multiple sensors positioned variously about fixture 100. Sensor 180 may be capable of detecting the distance of an object from fixture 100.

Sensor 180 may communicate with processing circuit 120 or transmit a signal to processing circuit 120. Processing circuit 120 may interpret the signal from sensor 180 and initiate one or more control actions based on the signal. For example, processing circuit 120 may be configured to determine whether an object or user is present in a detection region near sensor 180. Based on such determination, processing circuit 120 may raise or lower lid 104, seat 106, initiate a flushing process, activate lighting element 160, play music from speaker 170, etc. In some embodiments, sensor 180 may trigger music playback when a user is detected. The music may be preselected (e.g., by a user, automatically, etc.) from one of several potential sources including communications electronics 130 (e.g., SD card, radio, auxiliary input, Bluetooth, etc.), internal memory 124, and/or remote receiver 140.

In an exemplary embodiment, fixture 100 may be configured to independently raise and lower lid 104 and seat 106 based on a signal received from sensor 180. Lid 104 and seat 106 may be raised and lowered automatically without mechanical assistance from a user. For example, a user may trigger sensor 180 by placing a foot in the detection region 181 (e.g., shown to the side of fixture 100 in FIG. 2A). Fixture 100 may be configured to automatically raise lid 104 (shown in FIG. 2A) or both lid 104 and seat 106 (shown in FIGS. 2B and 2C) when sensor 180 is triggered. This automatic activation may allow a user to make use of fixture 100 in a standing position or a seated position without requiring manual adjustment of lid 104 or seat 106. Advantageously, the placement of sensor 180 on the side of plumbing fixture 100 may improve the functionality (e.g., accuracy, precision, responsiveness, ergonomics, etc.) of the lid and seat positioning system when the plumbing fixture is installed in a relatively small room.

In some bathroom configurations, a user must walk in front of or near fixture 100 when not using fixture 100. For example, a user may walk in front of or near fixture 100 when entering the bathroom, accessing a shower in the bathroom, using a sink in the bathroom, or otherwise moving about the bathroom. Advantageously, positioning detection region 181 to the side of fixture 100 may prevent unintended actuation of the toilet lid and/or seat by a user passing by fixture 100. In some embodiments, sensor 180 may be disabled by a user. For example, when the configuration of a bathroom would cause inadvertent triggering of sensor 180 it may be disabled.

In some embodiments, fixture 100 may include two or more sensors 180. Fixture 100 may include a proximity sensor configured to detect the presence of a user in front of fixture 100. The front proximity sensor may be configured to detect the presence of a user at one or more distances (e.g., 1 foot, 3 feet, 6 feet, etc.) from fixture 100. Advantageously, this allows a user to configure the front proximity sensor, in relating to the layout of the bathroom in which fixture 100 is installed, to avoid inadvertent triggering of the front proximity sensor. The side sensor may supplement or replace the front proximity sensor. An exemplary user interface for controlling the front sensor and side sensor is described in greater detail in reference to FIG. 8. In some embodiments, the front proximity sensor may be enabled and the side proximity sensor may be disabled. In other embodiments, the side proximity sensor may be enabled and the front proximity sensor may be disabled. In still further embodiments, all proximity sensors may be disabled. A user may disable one or more proximity sensors through the user interface (e.g., the exemplary user interface described in reference to FIG. 8). For example, a user may customize the proximity sensor configuration (e.g., the enabled and disabled proximity sensors) based on the configuration of the bathroom in which fixture 100 is installed. In some embodiments, an instillation team may configure the proximity sensors during instillation of fixture 100.

Figure 3:
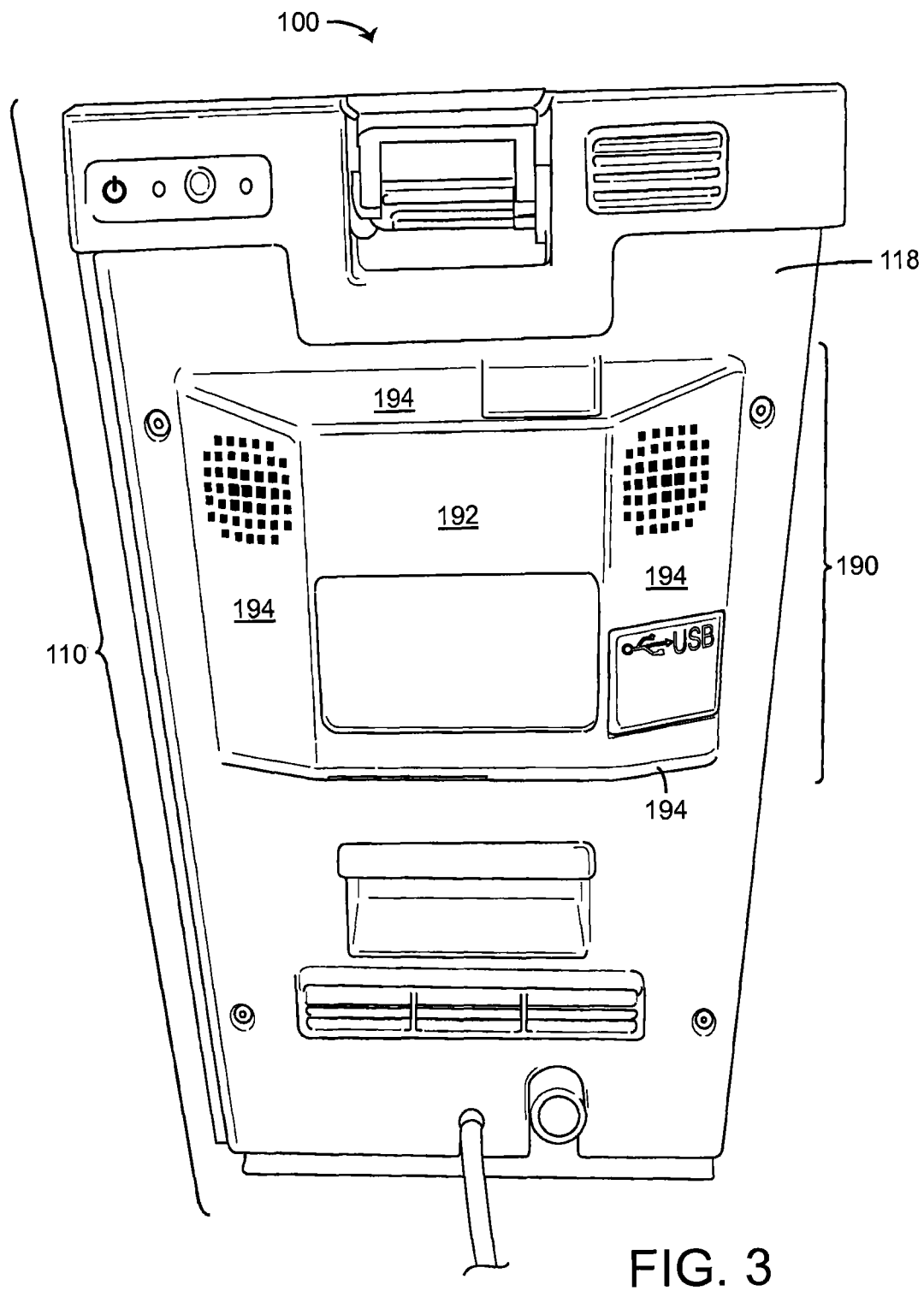
FIG. 3 is a drawing of the plumbing fixture from a rear perspective showing a section extending from the back of the housing, according to an exemplary embodiment.

Referring now to FIG. 3, a rear view of fixture 100 is shown, according to an exemplary embodiment. In some embodiments, housing 110 may include a section 190 which extends from the rear face 118 of housing 110. Advantageously, section 190 may align with a wall or other surface against which fixture 100 is installed. Section 190 may provide spacing between the wall and the body of fixture 100. This space may ensure that rear face 118 remains sufficiently spaced from the wall and/or accessible when fixture 100 is installed. In some embodiments, section 190 may be an integral part of rear face 118. For example, a single integral panel may form both rear face 118 section 190. In other embodiments, section 190 may be a separate structure positioned between rear face 118 and a wall against which fixture 100 is installed.

In some embodiments, section 190 may include a first face 192 and a second set of faces 194. First face 192 may be parallel to rear face 118 and separated from rear face 118 by a fixed horizontal distance. In other embodiments, first face 192 may have an angle of inclination relative to rear face 118. In the exemplary embodiment, first face 192 is rectangular; however, in other embodiments, first face 192 may have any other shape. Second faces 194 may connect first face 192 with rear face 118. As shown, multiple second faces 194 may exist. Each of second faces 194 may connect an edge of first face 192 with rear face 118. Second faces 194 may be trapezoidal, frustoconical, or any other shape.

Figure 4:
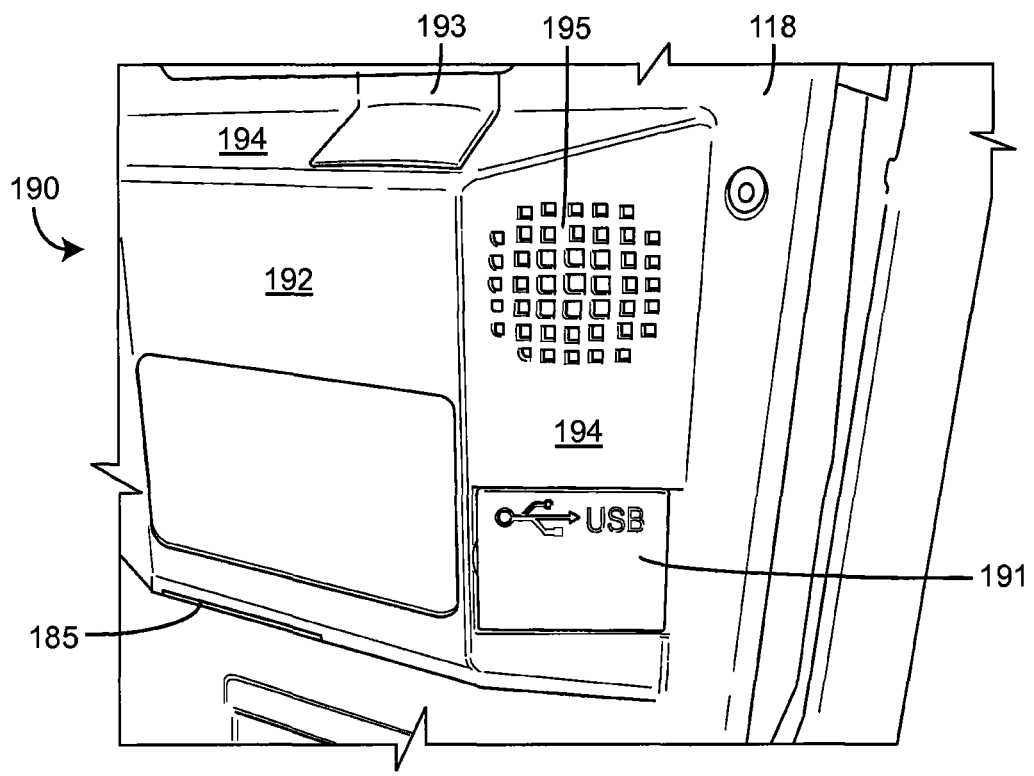
FIG. 4 is a detailed view of the section extending from the back of the housing, showing a speaker opening, a USB panel, a memory card panel, and an energy slot, according to an exemplary embodiment.

Referring now to FIG. 4, section 190 is shown in greater detail, according to an exemplary embodiment. Section 190 is shown to include a speaker opening 195, an energy source slot 185, a USB panel 191, and a memory card panel 193. Speaker opening 195 may be a hole, gap, port, slot, or other opening in section 190. Speaker opening 195 may be positioned near speaker 170 such that sound produced by speaker 170 exits section 190 at least partially through speaker opening 195. Speaker opening 195 may be a single opening or a plurality of smaller openings as shown in FIG. 4. Advantageously, the plurality of smaller openings may allow sound to exit section 190 while providing structural stability. The smaller openings may also prevent or reduce the probability that external objects will enter section 190 through opening 195, thereby reducing the potential for physical damage to speaker 170 or the other components of fixture 100.

In some embodiments, opening 195 is positioned in second face 194. Advantageously, this positioning may cause the sound produced by speaker 170 to exit section 190 at an angle relative to a wall against which fixture 100 may be installed. The angle of opening 195 may cause sound waves to reflect off the back wall at an angle and thereby may direct the emitted sound around fixture 100 (e.g., from a space between fixture 100 and the wall) and into an open volume in which the sound may be perceived by a user. The position of opening 195 in second face 194 may also increase the distance between opening 195 and the wall, thereby providing a greater spacing or volume in which sound produced by speaker 170 may propagate before contacting a solid object. These advantages may improve audio quality and allow speaker 170 to be more efficient at certain frequencies relative to alternative opening locations. In some embodiments, a plurality of speakers and/or openings 195 may exist. For example, referring again to FIG. 3, two openings 195 are shown in two of second faces 194. In embodiments which include multiple speakers 170, each of openings 195 may be positioned to at least partially align with one or more of speakers 170.

Still referring to FIG. 4, in some embodiments, section 190 may further include an energy source slot 185. Slot 185 may be configured to receive an energy source such as a battery, battery pack, or other energy storage device. Slot 185 may include one or more electrical connections (e.g., terminals, leads, wires, etc.) configured to complete a circuit when attached to an energy storage device. In some embodiments, slot 185 may be configured to accept a removable battery pack. The battery pack may contain one or more batteries and may arrange the batteries in series, in parallel, or in both configurations. The battery pack may function as a voltage stack, allowing multiple batteries to be combined into a larger battery with a greater terminal voltage. The battery pack may slide into slot 185. In some embodiments, the battery pack may be secured within slot 185 via a clip, peg, snap, or other fastener. Slot 185 may be used to supply fixture 100 with an alternate or backup source of power. Advantageously, the backup power supply may allow normal operation of fixture 100 (e.g., electronic, "push button," remote, automatic, etc.) to continue in the event of a power failure. This functionality, among other features, distinguishes fixture 100 from typical "smart toilets" which revert to manual operation (e.g., a pull cord, manual flush handle, etc.) in the event of a power failure.

Figure 5:
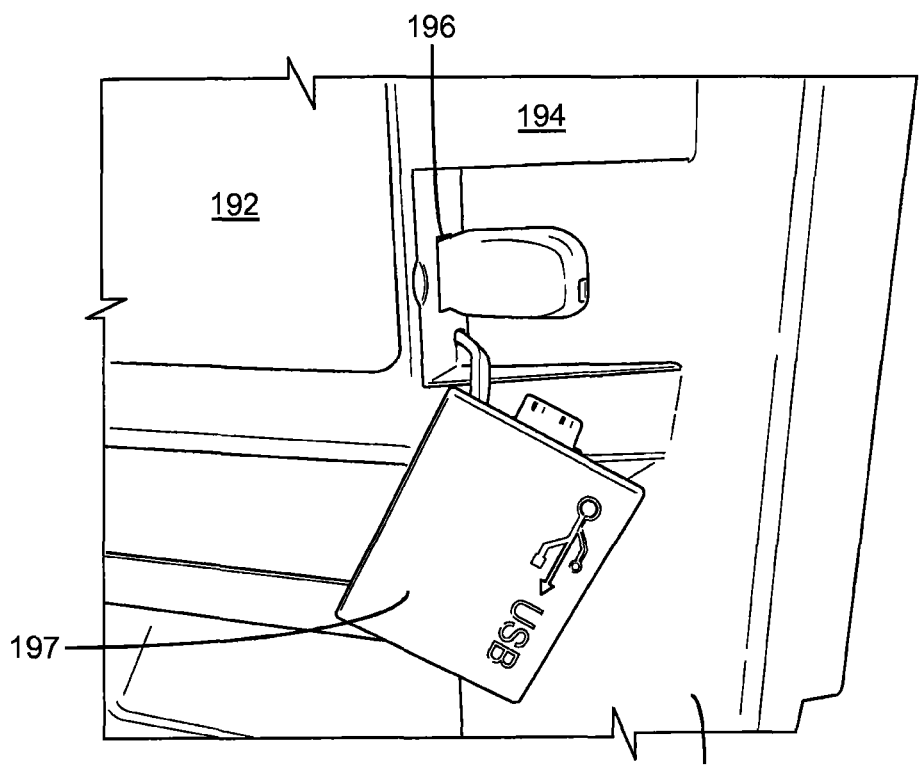
FIG. 5 is a detailed view of the USB panel showing a USB port and a cover for protecting the USB port, according to an exemplary embodiment.

Referring now to FIG. 5, USB panel 191 is shown in greater detail, according to an exemplary embodiment. USB panel 191 may include a USB port 196 and a protective cover 197. USB port 196 may be configured to receive a USB memory device such as a solid state memory device (e.g., flash memory, DRAM, etc.) or a magnetic hard disk drive via a USB interface. USB port 196 may allow fixture 100 to make use of USB connection 131. For example, when a USB memory device is inserted into USB port 196, data stored within the memory device may become accessible to fixture 100 via USB connection 131. USB port 196 may allow processing circuit 120 to access audio data, video data, image data, or other media stored within the memory device. Such data may be received by processing circuit 120, processed and encoded if necessary, and provided to speaker 170 as an audio signal.

In some embodiments, USB panel 191 may further include a protective cover 197. Cover 197 may be configured to align with second face 194. Cover 197 may fit over an opening between face 194 and USB port 196, thereby protecting port 196 from external sources of damage. In some embodiments, cover 197 may fit over USB port 196 directly whereas in other embodiments, a space may exist between port 196 and cover 197. In some embodiments, USB panel 191 may be configured to provide sufficient space between second face 194 and USB port 196 such that cover 197 may align with second face 194 when a USB memory device is inserted into port 196.

Figure 6:
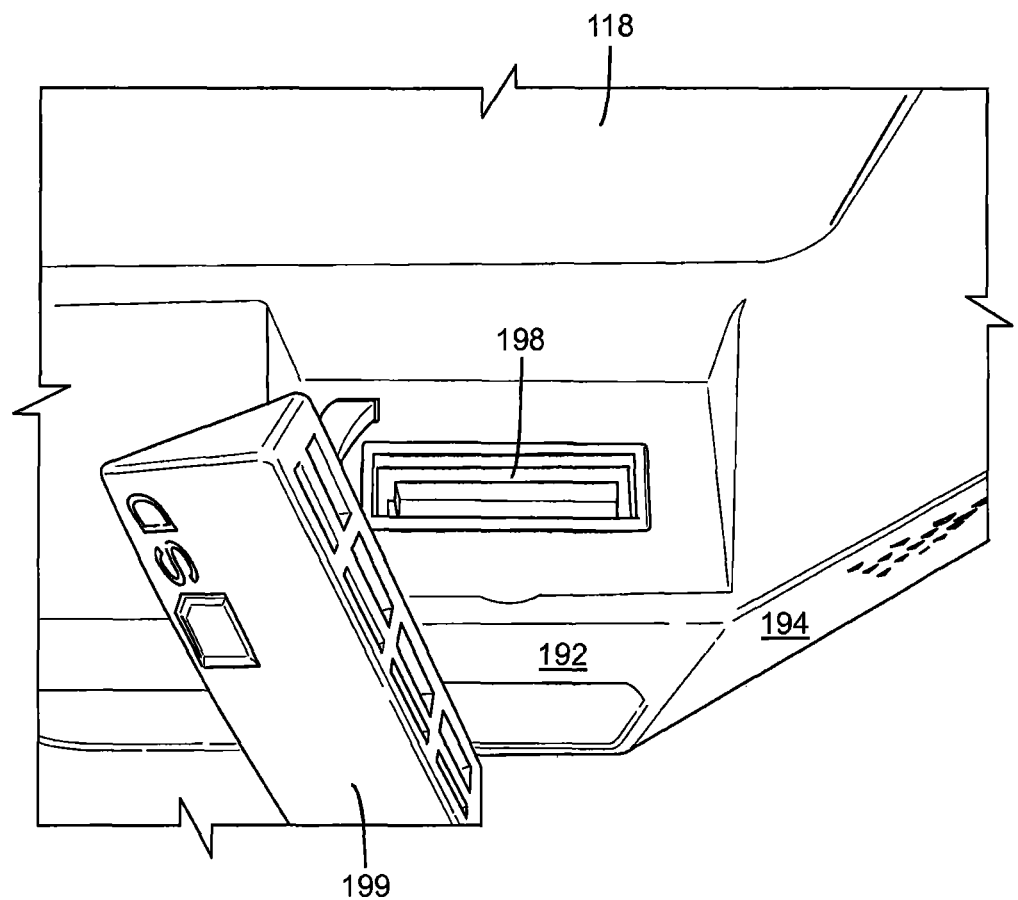
FIG. 6 is a detailed view of the memory card panel showing a memory card port and a cover for protecting the memory card port, according to an exemplary embodiment.

Referring now to FIG. 6, memory card panel 193 is shown in greater detail, according to an exemplary embodiment. Memory card panel 193 may include a memory card port 198 and a protective cover 199. Port 198 may be configured to receive a memory card device (e.g., a solid state memory card, flash memory, DRAM, etc.) such as a Secure Digital (SD) memory card. Port 198 may allow fixture 100 to make use of memory card reader 132. For example, when a memory card is inserted into memory card port 198, data stored within the memory card may become accessible to fixture 100 via memory card reader 132. Port 198 may allow processing circuit 120 to access audio data, video data, image data, or other media stored within the memory card. Such data may be received by processing circuit 120, processed and encoded if necessary, and provided to speaker 170 as an audio signal.

In some embodiments, memory card panel 193 may further include a protective cover 199. Cover 199 may be configured to align with one of second face 194. Cover 197 may fit over an opening between face 194 and memory card port 198, thereby protecting port 198 from external sources of damage. In some embodiments, cover 197 may fit over port 198 directly whereas in other embodiments, a space may exist between port 198 and cover 199. In some embodiments, memory card panel 193 may be configured to provide sufficient space between second face 194 and memory card port 198 such that cover 199 may align with second face 194 when a memory card is inserted into memory card port 198.

Referring now to FIGS. 5 and 6, covers 197,199 may be made of a flexible polymeric material such as rubber or any other suitable material. Covers 197,199 may be connected to section 190 via respective tethers. The tethers may prevent covers 197,199 from completely detaching from section 190, thereby reducing the likelihood that covers 197,199 will be lost or misplaced. Covers 197,199 may be marked to indicate the location of USB panel 191 and memory card panel 193.

Advantageously, in some embodiments, USB port 196 and memory card port 198 may define openings in section 190 oriented parallel to rear face 118. The alignment of ports 196,198 with rear face 118 may allow a USB device or memory card to be inserted into port 196,198 without requiring additional space between section 190 and a wall against which fixture 100 may be installed.

Figure 7A:
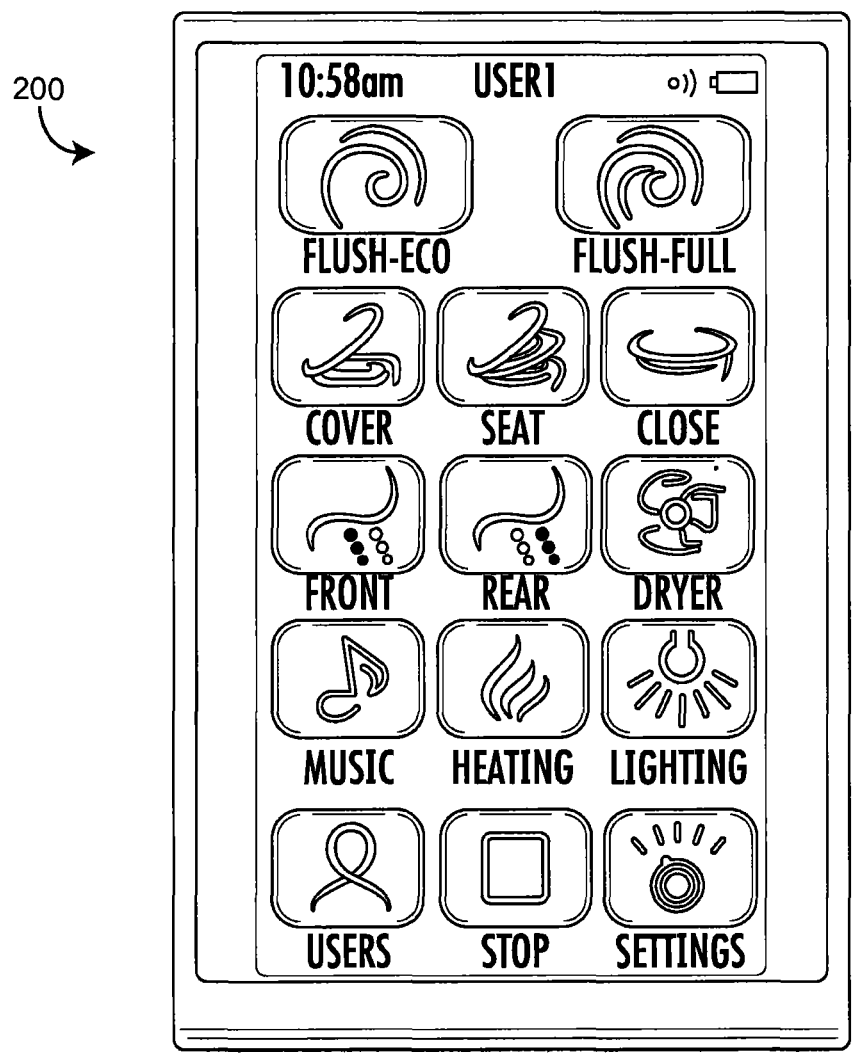
FIG. 7A is a drawing of a user operable remote control device for operating the electronic plumbing fixture, according to an exemplary embodiment.

Referring now to FIG. 7A, a remote control device 200 for use with fixture 100 is shown, according to an exemplary embodiment. Remote control device 200 may provide an interactive user interface for fixture 100. In some embodiments, device 200 may be used to transmit information or other electronic data to fixture 100. Such information may include operating commands (e.g., raise lid 104, flush basin 102, activate lighting element 160, etc.), configuration information (e.g., user profile data, music and lighting preferences, connectivity information, etc.), media (e.g., streaming audio, etc.), or any other type of data. In some embodiments, device 200 may also receive information or other electronic data from fixture 100. Such information may include diagnostic information, current configuration settings, user profile and customization settings, usage information, etc.

Remote control device 200 is shown to include several selectable icons. Selecting an icon (e.g., by touching an area of the display screen associated with the icon) may cause device 200 to transmit an operating command to fixture 100. For example, selecting the "fluch-eco" icon may trigger a flushing process configured to use a minimal amount of water. Selecting the "flush-full" icon may trigger a full flushing process configured to use a normal amount of water. Selecting the "cover" icon may raise or lower cover 104. Selecting the "seat" icon may raise or lower seat 106. Selecting the "close" icon may close cover 104, seat 106, or both cover 104 and seat 106. Selecting the "front" icon, the "rear" icon or the "dryer" icon may cause fixture 100 to extend a bidet wand and cause remote control device 200 to display a user interface for controlling bidet operation. Selecting the "music" icon may cause device 200 to display a user interface for selecting audio sources and controlling audio playback (e.g., interface 450, described in greater detail in reference to FIGS. 9C-9D). Selecting "heating" may cause device 200 to display a user interface for controlling a heating element within seat 106 and/or a separate heating element positioned on or beneath a lower surface of fixture 100. Selecting "lighting" may cause device 200 to display a lighting control user interface (e.g., UI 500, described in greater detail in reference to FIGS. 10A-10B). Selecting "users" may cause device 200 to display a user interface for adjusting user-specific settings (e.g., user profile information, user preferences, etc.). Selecting "settings" may cause device 200 to display a user interface through which configuration settings may be specified or viewed (e.g., UI 600, described in greater detail in reference to FIG. 11A).

Figure 7B:
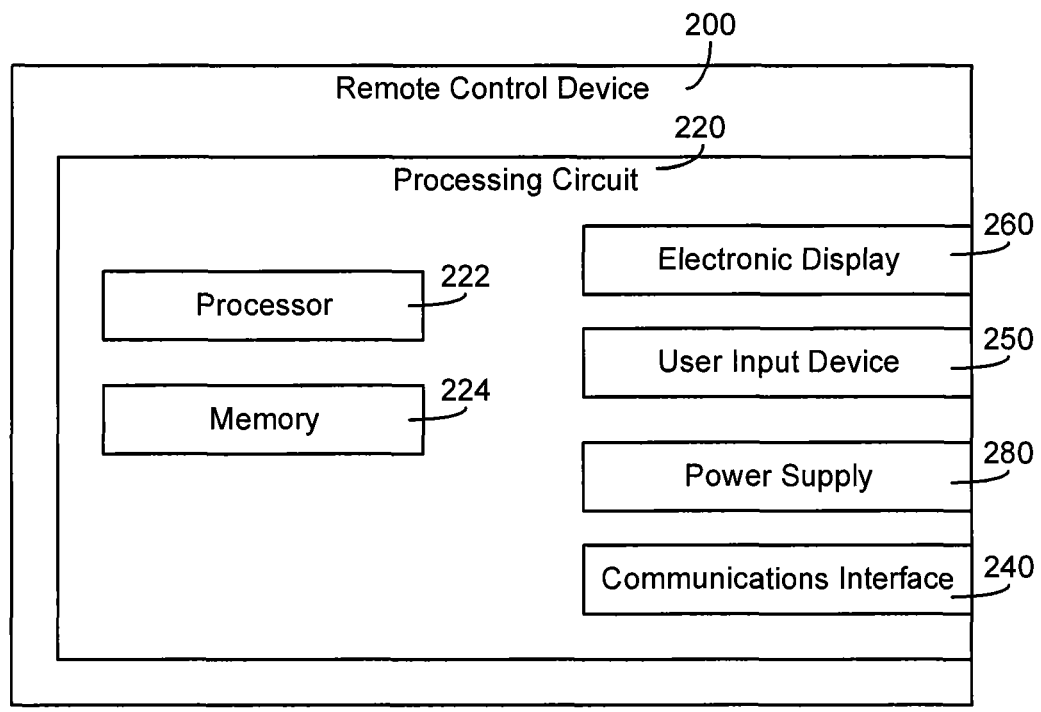
FIG. 7B is a block diagram of the electrical components of the remote control device including a processing circuit, a communications interface, a user input device, an electronic display, and a power supply, according to an exemplary embodiment.

Referring now to FIG. 7B, a block diagram of remote control device 200 is shown, according to an exemplary embodiment. Device 200 is shown to include a processing circuit 220, a communications interface 240, an input device 250, an electronic display 260, and a power supply 280.

Processing circuit 220 may include a processor 222 and memory 224. Processor 222 may be implemented as a general purpose processor, an application specific integrated circuit (ASIC), one or more field programmable gate arrays (FPGAs), a CPU, a GPU, a group of processing components, or other suitable electronic processing components. Memory 224 may include one or more devices (e.g., RAM, ROM, Flash memory, hard disk storage, etc.) for storing data and/or computer code for completing and/or facilitating the various processes, layers, and modules described in the present disclosure. Memory 224 may comprise volatile memory or non-volatile memory. Memory 224 may include database components, object code components, script components, or any other type of information structure for supporting the various activities and information structures described in the present disclosure. For example, memory 224 may include instructions for interpreting (e.g., via processor 222) the inputs received from communications interface 240 and input device 250. Memory 224 may further include instructions for producing a visual output on electronic display 260 or for sending or receiving data via communications interface 240.

Still referring to FIG. 7B, device 200 may further include a communications interface 240. Communications interface 240 may include one or more wired or wireless interfaces (e.g., jacks, antennas, transmitters, receivers, transceivers, wire terminals, Bluetooth devices, etc.) for conducting data communications with fixture 100 or other local or remote devices or systems. Communications interface 240 may allow device 200 to communicate with a wireless networking device (e.g., a wireless router, cell phone, wireless-enabled computer, laptop, tablet, or other wireless device) or a wired networking device (e.g., via an Ethernet cable, a SATA cable, USB cable, or other physical data connection). In some embodiments, communications interface 240 may enable device 200 to exchange data such as electronic media (e.g., audio or video files, audio or video streams, pictures, etc.), configuration information (e.g., system settings, user preferences, etc.), or operating commands (e.g., initiating the flushing process, activating lighting element 160, emitting sound from speaker 170, etc.) with fixture 100.

Still referring to FIG. 7B, device 200 may further include a user input device 250. Input device 250 may allow a user to interact with device 200 and control the operation of fixture 100. In some embodiments, input device 250 may use touch-sensitive technology (e.g., capacitive touch, piezoelectric, etc.) and/or field-of-effect technology (e.g., projected capacitive, electrostatic, etc.). Input device 250 may include one or more buttons, keys, dials, sliders, microphones, or other elements capable of receiving input from a user.

Device 200 may further include an electronic display 260. Display 260 may be a liquid crystal display (LCD), organic light emitting diode (OLED), thin film transmitter (TFT), or other monitor capable of displaying information or providing visual feedback to a user. In some embodiments, display 260 may be a touch-sensitive display capable of both displaying information and receiving a user's touch input. In some embodiments, display 260 may be combined with user input device 250 into an integrated touch-sensitive display device.

Still referring to FIG. 7B, device 200 may further include a power supply 280. Power supply 280 may include one or more batteries, capacitors, energy cells, or other elements capable of storing energy. Power supply 280 may supply power to processing circuit 220, electronic display 260, user input device 250, or communications interface 240. In some embodiments, power supply 280 may be rechargeable. Power supply 280 may be configured to receive energy from a remote docking station such as remote docking station 290.

Figure 7C:
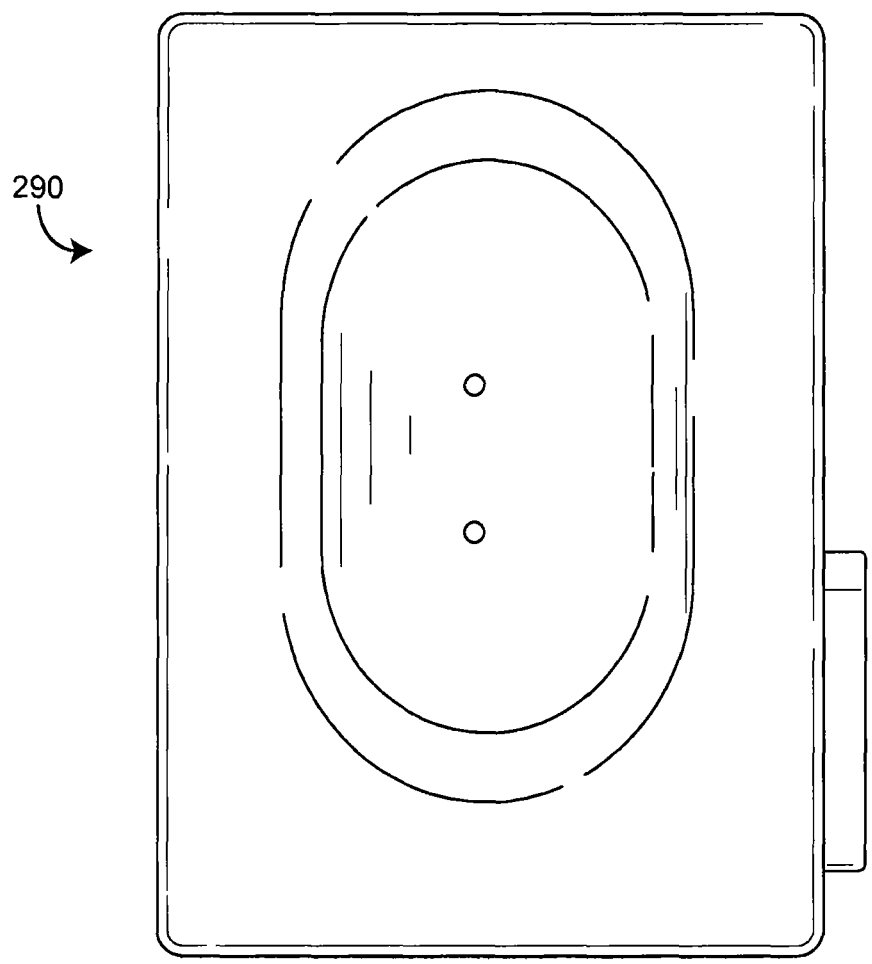
FIG. 7C is a drawing of a remote docking station for storing and recharging the remote control device, according to an exemplary embodiment.

Referring now to FIG. 7C, remote docking station 290 is shown, according to an exemplary embodiment. Docking station 290 may mounted on a wall or other surface and may be configured to attach to remote control device 200. Docking station 290 may provide a sanitary and aesthetic location to store device 200 when not in use. Advantageously, docking station 290 may electrically connect with power supply 280 when attached to device 200. The electrical connection may allow docking station 290 to recharge or otherwise supply energy to device 200. In some embodiments, the electrical connection between docking station 290 and device 200 may be a direct physical connection (e.g., via electrical leads, wires, plugs, etc.) In other embodiments, docking station 290 may recharge device 200 using inductive charging. In some embodiments, docking station 290 may receive power from a standard residential or commercial power source (e.g., a 120V 60 Hz AC power supply) and transform such power for transmission to device 200. The transformation process may involve an AC/DC conversion, a voltage increase, a voltage reduction, or the projection of an electromagnetic field. Advantageously, docking station 290 may reduce or eliminate the need to exchange depleted batteries for charged batteries in device 200.

Referring now to FIGS. 8-11, several different user interfaces 300-600 (e.g., input and output options presented to a user) for controlling various features of fixture 100 via remote control device 200 are shown, according to exemplary embodiments. In some embodiments, interfaces 300-600 may be displayed to a user via electronic display 260. In other embodiments, interfaces 300-600 may be displayed on other visual display devices (e.g., a computer monitor, tablet, cell phone, or other display for a device capable of networking with fixture 100 or remote control device 200. In some embodiments, interfaces 300-600 may be displayed on control panel 150.

Figure 8:
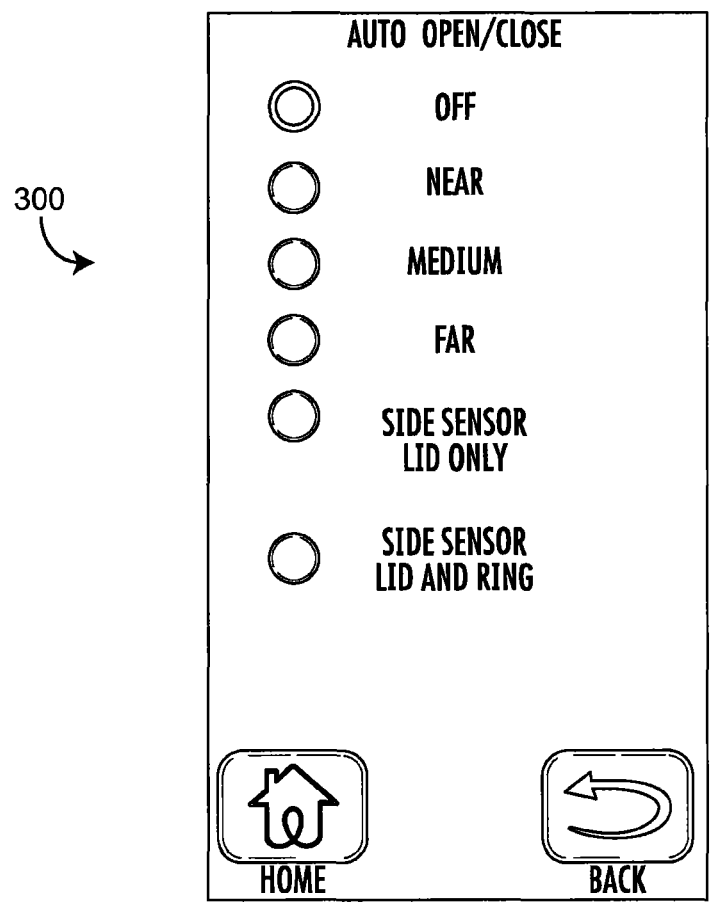
FIG. 8 is a drawing of a user interface for customizing the automatic movement of the lid and seat based on a signal received from the sensor, according to an exemplary embodiment.

Referring specifically to FIG. 8, an exemplary user interface 300 for controlling the automatic movement of lid 104 and seat 106 between an open and closed position is shown, according to an exemplary embodiment. Interface 300 may provide a user with several options for controlling how fixture 100 responds to the presence of a nearby user. In some embodiments, fixture 100 may include a front sensor and a side sensor. The front sensor may be a proximity sensor configured to detect the presence of a user at various distances in front of fixture 100. The side sensor may be configured to detect a user's foot or leg to the side of fixture 100. Interface 300 may provide a user with several control options regarding sensor utilization (e.g., front sensor, side sensor, no sensor, etc.), detection distance (e.g., near, medium, far), and detection response (e.g., raise lid 104 only, raise both lid 104 and seat 106, etc.).

Still referring to FIG. 8, selecting the "off" option may disable automatic operation of lid 104 and seat 106. Selecting the "near," "medium," or "far" options may configure fixture 100 to use the front proximity sensor for automatically opening and closing lid 104 and/or seat 106. For example, selecting the "near" option may configure fixture 100 to raise lid 104 and/or seat 106 when a user is detected at first distance (e.g., 1 foot) in front of fixture 100. Selecting the "medium" option may configure fixture 100 to raise lid 104 and/or seat 106 when a user is detected at a second distance (e.g., 3 feet) in front of fixture 100. Selecting the "far" option may configure fixture 100 to raise lid 104 and/or seat 106 when a user is detected at a third distance (e.g., 6 feet) in front of fixture 100. A user may select "side sensor lid only" or "side sensor lid and ring" to specify that the side sensor 180 (e.g., as shown in FIG. 2A) will control whether lid 104 or both lid 104 and seat 106 will be opened when the side sensor 180 is triggered. In an exemplary embodiment, a user may trigger sensor 180 by placing a foot in the detection region. This automatic activation may allow a user to make use of fixture 100 in a standing position or a seated position without requiring manual adjustment of lid 104 or seat 106.

Figures 9A, 9B:
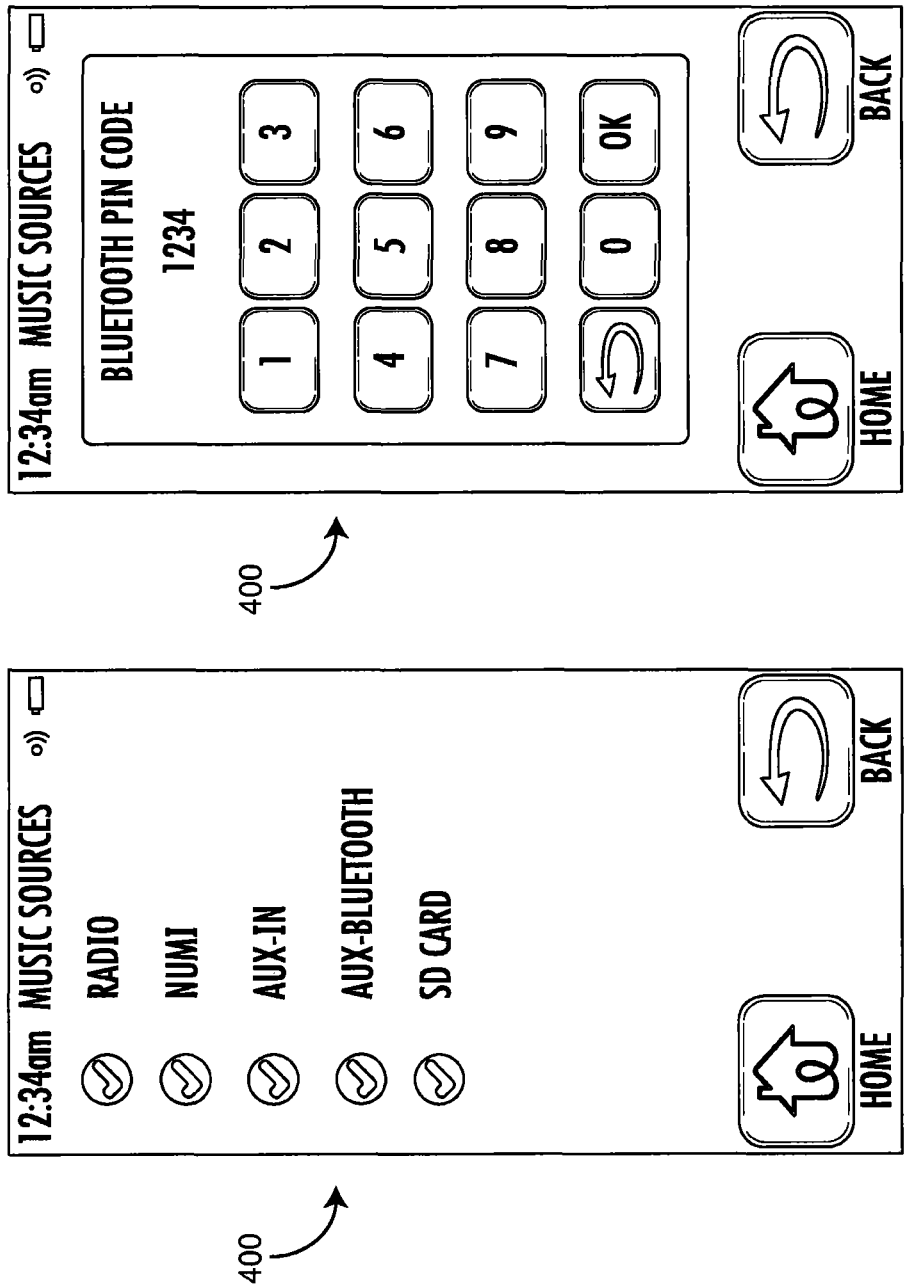
FIG. 9A is a drawing of a user interface for selecting potential audio sources for the plumbing fixture, according to an exemplary embodiment.
FIG. 9B is a drawing of a Bluetooth pin code prompt for linking the plumbing fixture with a remote Bluetooth-capable data source, according to an exemplary embodiment.

Referring now to FIGS. 9A-9B, an exemplary user interface 400 for activating one or more audio sources is shown. Interface 400 may cause device 200 to display a list of several audio sources. A user may select one or more of the audio sources to enable access to the selected audio source. For example, if a memory card (e.g., SD or other memory card) is inserted into memory card port 198, selecting the audio source labeled "SD card" may allow access to data stored on the memory card via memory card reader 132. Selecting the audio source labeled "radio" may allow access to various radio signals via radio receiver 134. Selecting the audio source labeled "Numi" may allow access to data stored in local memory 124. Selecting the audio source labeled "aux-in" may allow access to one or more auxiliary data sources via auxiliary input 133. In some embodiments, when the audio source labeled "aux-Bluetooth" is selected, a user may be prompted to enter a Bluetooth pin code. The user may then enter the same pin code into another Bluetooth-capable device to allow fixture 100 to access media stored on the device. Advantageously, interface 400 may permit deselection or deactivation of one or more audio sources. Deselecting an audio source via interface 400 may prevent the audio source from appearing in other user interfaces (e.g., user interface 450). This functionality may allow a user to simplify or "clean up" other user interfaces by preventing display of audio source options which are not desired or not utilized for a particular installation of fixture 100.

Referring now to FIGS. 9C-9D, an exemplary user interface 450 for controlling speaker 170 (e.g., to play music from one or more audio sources) is shown. A user may select one of the tabs 470 labeled "radio," "aux," or "SD" to display the control options available for each type of audio source. For example, if the "radio" tab is selected, device 200 may display a radio tuner dialog and volume control slider. The radio tuner may be used to select a radio station and the volume slider may be used to control the volume of the sound emitted from speaker 170.

If the "aux" tab is selected, device 200 may display a volume slider 452 as well as multiple auxiliary input sources 460. Selecting the icon 462 depicting a 3.5 mm stereo "headphone" plug may instruct processing circuit 120 to transmit an audio signal from auxiliary input 133 or USB connection 131 to speaker 170. Selecting the icon 464 depicting the Bluetooth logo may instruct processing circuit 120 to transmit an audio signal from Bluetooth connection 136 to speaker 170. Selecting the icon 466 labeled "numi" may instruct processing circuit 120 to transmit an audio signal from memory 124 to speakers 170.

If the "SD" tab is selected, device 200 may display a volume slider 482 and a plurality of audio control functions 490. In an exemplary embodiment, the available control functions may include pausing an audio track, resuming playback of an audio track, and switching between audio tracks. A user may be able to switch between tracks by advancing to the next track, reverting to the previous track, or selecting a random track (e.g., via the "shuffle" function). Advantageously, fixture 100 may be able to actively control playback of audio tracks (e.g., pausing, resuming, skipping, etc.) in addition to processing (e.g., decoding, filtering, playing, etc.) an audio feed from an externally-controlled audio source. In some embodiments, audio control functions 490 may be available for other audio sources which allow a user to control speaker 170.

Figure 10B:
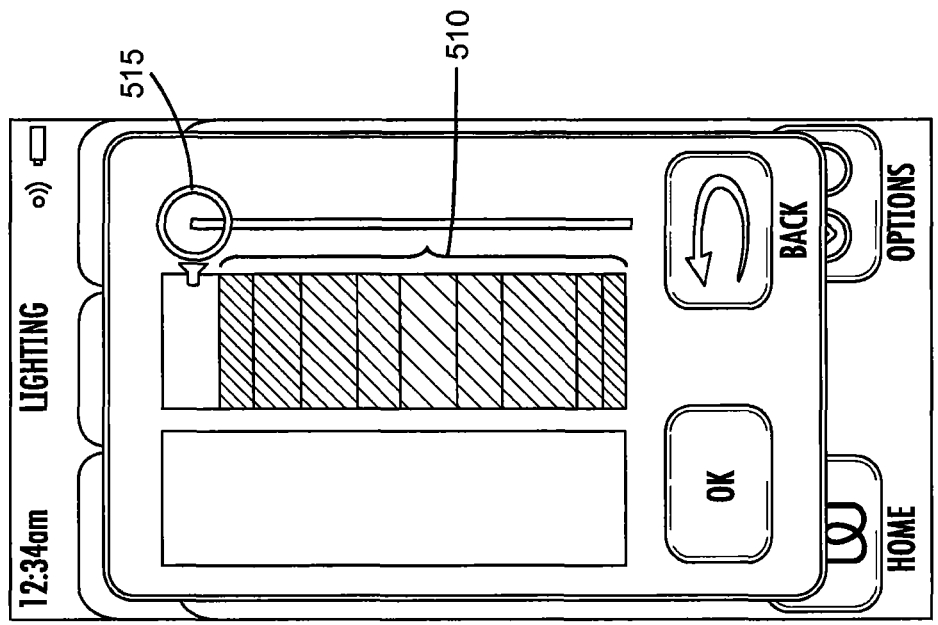
FIG. 10B is a drawing of a user interface for selecting a color of light for emission from the lighting element, according to an exemplary embodiment.
Figure 10A:
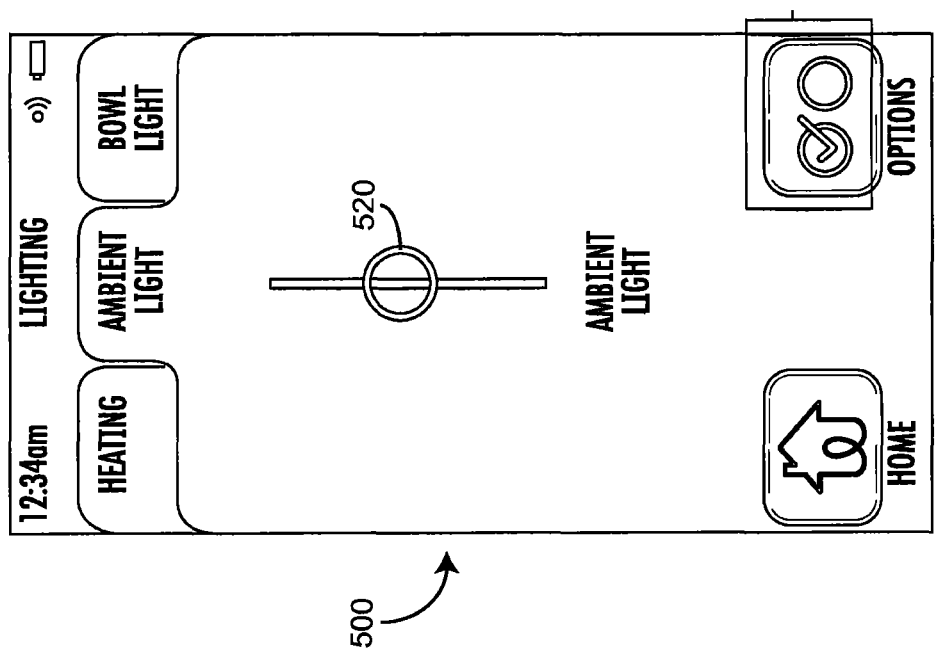
FIG. 10A is a drawing of a user interface for adjusting the brightness of light emitted from the lighting element, according to an exemplary embodiment.

Referring now to FIGS. 10A-10B, an exemplary user interface 500 for selecting one or more colors for emission from lighting element 160 is shown. For example, in some embodiments, device 200 may display a color spectrum 510 from which a desired color may be selected via slider 515. In other embodiments, the user may select a color by specifying color saturation values (e.g., RGB values, hexadecimal color codes, relative intensity of component colors, etc.). In some embodiments, the available colors may include visible light (e.g., red to violet). In other embodiments, infrared and ultraviolet color choices may be available. Device 200 may display a slider 520 for controlling the overall brightness of the emitted light.

Figure 11A:
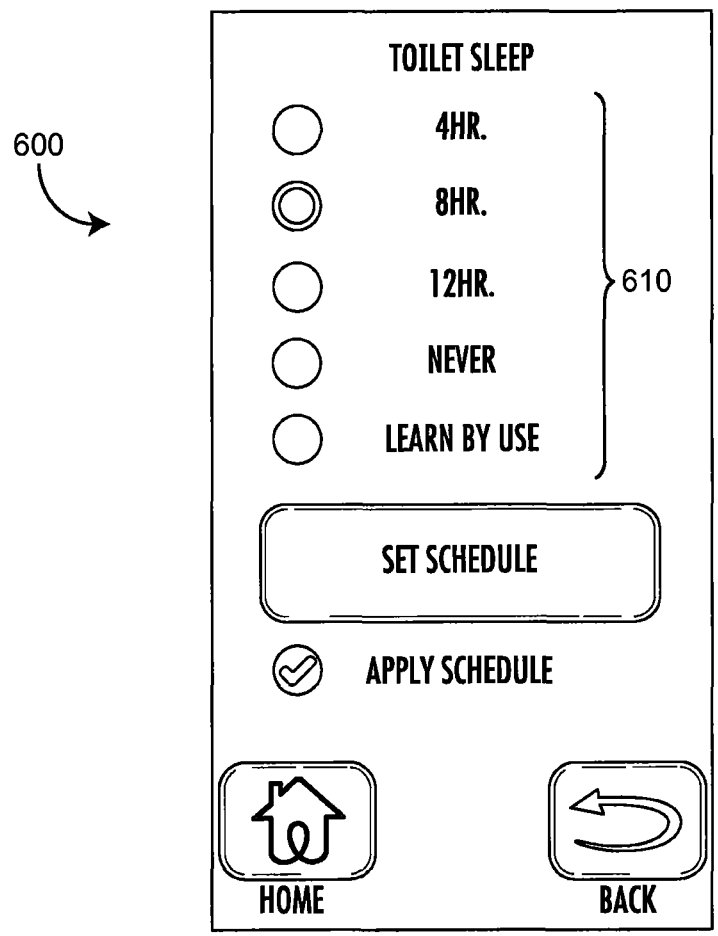
FIG. 11A is a drawing of a user interface for setting an energy conservation mode for the plumbing fixture, according to an exemplary embodiment.

Referring now to FIG. 11A, an exemplary user interface 600 for controlling a power conservation routine (e.g., routine 700) is shown. Interface 600 may cause device 200 to display a list of options 610 regarding if and when fixture 100 enters a power conservation mode (e.g., a low-power mode or a "sleep" mode). When the power conservation mode is triggered, one or more features of fixture 100 may be disabled. For example, the power conservation mode may disable a thermal seat warmer, an automated cleaning routine, or other power-consuming feature of fixture 100. Selectable options 610 are shown to include "4 hour," "8 hour," "12 hour," "never," "set schedule," and "learn by use." The effects of selecting any one of options 610 are described in greater detail in reference to FIG. 11B.

Figure 11B:
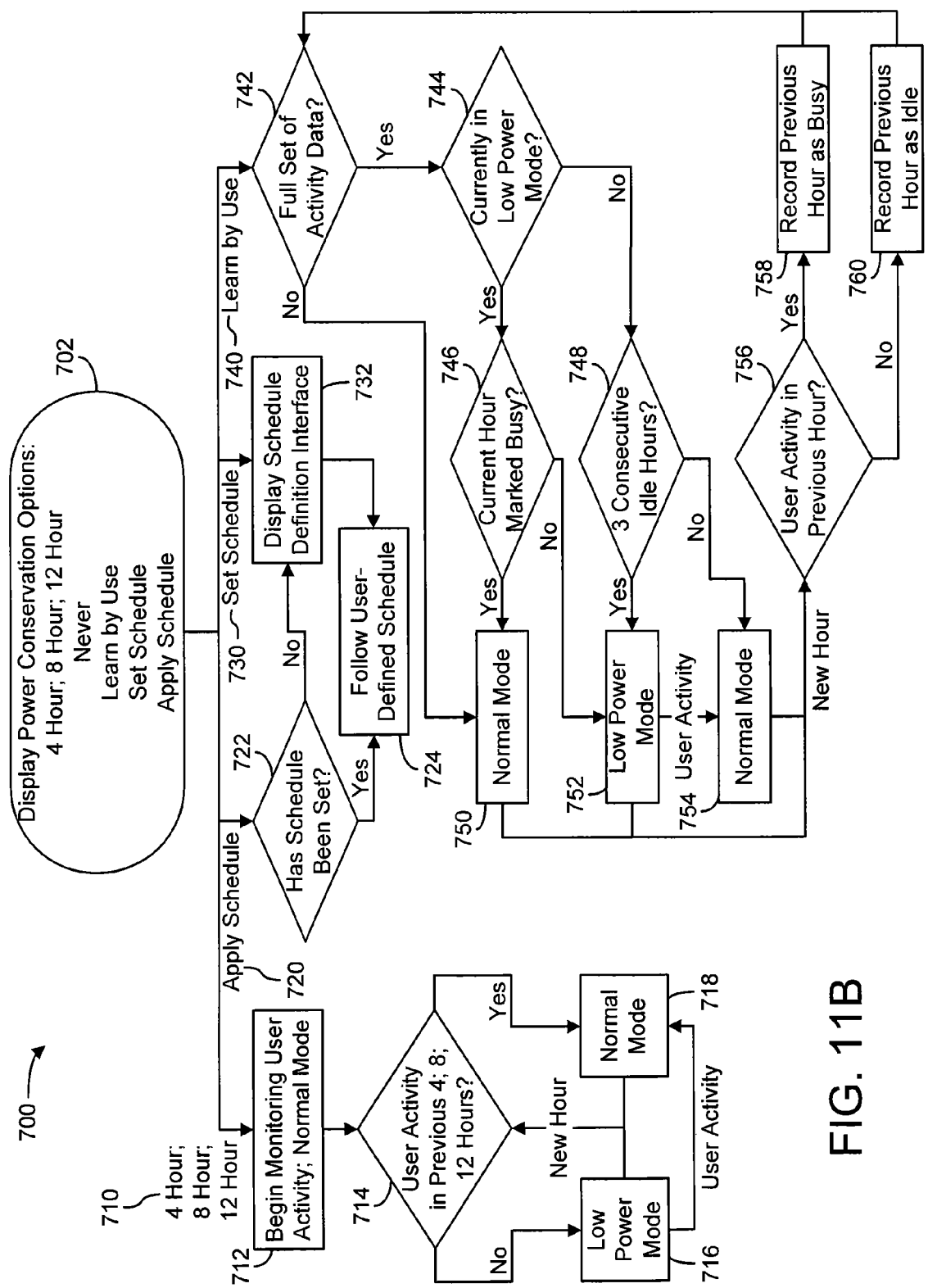
FIG. 11B is a flowchart of a process for automatically determining and implementing an optimal energy conservation schedule based on empirical usage data, according to an exemplary embodiment.

Referring now to FIG. 11B, a flowchart illustrating a power conservation routine 700 is shown, according to an exemplary embodiment. Routine 700 may start by displaying a list of selectable power conservation options (e.g., options 610) (block 702). Fixture 100 may initiate one or more sub-routines (e.g., subroutine 710, 720, 730, or 740) based on the selected power conservation option.

Still referring to FIG. 11B, when "4 hour," "8 hour," or "12 hour" are selected, fixture 100 may initiate sub-routine 710. Sub-routine 710 may begin by monitoring user activity (step 712). In some embodiments, user activity includes any type of user interaction with fixture 100. For example, user activity may include operating control panel 150, interacting with fixture 100 via remote controller 200, inserting a memory card into card reader 132, or activating sensor 180. In some embodiments, mere detection of a user (e.g., via sensor 180) may constitute user activity. In other embodiments, user activity may be limited to specific uses of fixture 100 such as flushing fixture 100, using the bidet, playing music from speaker 170, activating lighting element 160, initiating a cleaning process, etc. In other embodiments, user activity may be limited to usage of one or more features which are disabled or affected by the power conservation mode. The definition of which types of usage quality as user activity may be customizable. While user activity is being monitored, step 712 may include activating or maintaining a normal operating mode.

Sub-routine 710 may further include determining whether any user activity has occurred within the previous four, eight, or twelve hours, depending on whether "4 hour," "8 hour," or "12 hour" is selected (step 714). For example, if "4 hour" is selected, step 714 may include determining whether any user activity has occurred within the previous four hours. In some embodiments, sub-routine 710 waits until four, eight, or twelve hours has passed since sub-routine 710 was selected before performing step 714. In other embodiments, step 714 is performed immediately upon activating sub-routine 710. In further embodiments, step 714 may be performed after waiting for an intermediate period (e.g., less than four, eight, or twelve hours) or longer period (e.g., longer than four, eight, or twelve hours). For example, fixture 100 may wait until the beginning of a new hour (e.g. 12:00, 1:00, 2:00, etc.) before performing step 714.

If no user activity is detected during the previous four, eight, or twelve hour time period, sub-routine 710 may include activating the power conservation (e.g., low power) mode (step 716). If user activity is detected during the previous four, eight, or twelve hour time period, sub-routine 710 may include maintaining or activating a normal operating mode (step 718). In some embodiments, the low power mode or normal operating mode may remain active until at least a full hour has elapsed, at which point step 714 may be repeated. In other embodiments, subroutine 710 may include switching from the low power mode to the normal mode upon user activity. The switch may be made immediately upon detection of user activity without repeating step 714.

Still referring to FIG. 11B, when "Apply Schedule" is selected, fixture 100 may initiate subroutine 720. Subroutine 720 may begin by determining whether a user-defined schedule has been set (step 722). If a schedule has been set, subroutine 720 may include following the user-defined schedule (step 724). If a schedule has not been set, subroutine 722 may include displaying a schedule definition interface (step 732).

When "Set Schedule" is selected, fixture 100 may initiate subroutine 730. Subroutine 730 may also be initiated when "Apply Schedule" is selected and no schedule has been set.

In some embodiments, step 732 may include displaying a list, calendar, grid, or other timetable of the times at which fixture 100 is scheduled to activate the power conservation mode. The schedule definition interface may allow a user to specify such times without relying on an automatic detection of user activity. In some embodiments, step 732 may permit a user to define a schedule which switches between the low power mode and the normal mode as frequently as once per hour. In other embodiments more precise durations (e.g., half-hourly, quarter-hourly) may be available. In further embodiments, even more precise durations (e.g., to the minute, second, etc.) may be specified. Once a user-defined schedule has been set, subroutine 730 may include following the user-defined schedule (step 724).

When "Learn by Use" is selected, fixture 100 may initiate subroutine 740. Subroutine 740 may be an automatic power conservation routine configured to monitor user activity and optimally set the power conservation schedule based on learned usage patterns. In some embodiments, subroutine 740 may include a learning phase (e.g., data collection phase, initialization phase, etc.) during which user activity is monitored and/or user activity data is recorded. User activity data may relate to when fixture 100 is used (e.g., a time of day, hour, minute, etc.), which features are used, the active user profile during each use, the length of use, or any other relevant usage statistic. In some embodiments, the learning phase may continue until the end of a pre-defined learning period (e.g., a day, a week, a month, etc.). In other embodiments, the duration of the learning phase may be customizable or adaptable (e.g., by a user, automatically based on initial patterns, etc.). In some embodiments, the learning phase includes marking discrete time periods as either "Busy" or "Idle" based on whether user activity occurred during the time period.

Subroutine 740 may further include an implementation phase. The implementation phase may include optimally setting a power conservation schedule based on the empirical usage data (e.g., whether a time period is marked "Busy" or "Idle"). In some embodiments, the power conservation schedule may be set such that the power conservation mode is not activated unless a minimum number of "Idle" periods occur consecutively. Advantageously, in some embodiments, a learning phase and an implementation phase may occur concurrently. For example, subroutine 740 may implement a power conservation schedule based on previous activity data while collecting activity data for a subsequent power conservation schedule.

Still referring to FIG. 11B, subroutine 740 may begin by determining whether a full set of activity data is present (step 742). Step 742 may involve retrieving a pre-defined schedule duration from memory and determining whether sufficient user activity data has been collected to set a schedule for the defined duration. For example, if the schedule duration is 168 hours (e.g., one week), step 742 may require a full week of activity data to have been collected before analyzing and setting the 168-hour power conservation schedule. In other embodiments, step 742 may define a "full set" of activity data as sufficient data from which a schedule of the pre-defined duration may be extrapolated, repeated, or estimated. For example, one day of usage data may be extrapolated or repeated to set a weekly schedule.

Still referring to step 742, if a full set of activity data is not present, subroutine 740 may involve maintaining or resuming a normal operating mode (step 750). The normal mode of operation may be maintained until sufficient activity data has been collected. Upon the end of a discrete time interval or beginning of a new time interval (e.g., a new hour, half-hour, minute, etc.), subroutine 740 may involve determining whether any user activity has occurred during the previous time interval (e.g., the previous hour) (step 756). If user activity has occurred, the previous time interval may be recorded or marked as "Busy" (step 758). If user activity has not occurred, the previous time interval may be marked as "Idle" (step 760). After marking the previous time interval as "Busy" or "Idle," step 742 may be repeated by determining whether a full set of activity data is present.

Referring again to step 742, if a full set of activity data is present, subroutine 740 may involve determining whether the low power mode is currently active (step 744). Step 744 may be performed to distinguish between whether activating the low power mode would require (1) switching to the low power mode from the normal mode or (2) maintaining fixture 100 in the low power mode.

Referring to step 744, if the low power mode is not currently active, subroutine 740 may involve determining whether a sufficient number of consecutive "Idle" time intervals exist to warrant activating the low power mode (step 748). In the exemplary embodiment illustrated in FIG. 11B, three consecutive hours of "Idle" time are sufficient to activate the low power mode (e.g., three consecutive one-hour intervals of "Idle" time, six consecutive half-hour intervals of "Idle" time, etc.). In other embodiments, a greater or lesser amount of "Idle" time may be sufficient to activate the low power mode. Advantageously, a minimum "Idle" duration before activating the low power mode may increase the likelihood that the low power mode will not be active at a time of desired usage. The time intervals considered by step 748 may include the current time interval consecutive time intervals immediately thereafter.

Referring to step 748, if a sufficient number of consecutive "Idle" intervals exist (e.g., three consecutive "Idle" hours), subroutine 740 may involve activating the low power mode (step 752). In some embodiments, the low power mode may remain active until the beginning of a new time interval (e.g., a new hour). In other embodiments, the normal mode may be activated within a time interval if user activity is detected (step 754). Referring again to step 748, if an insufficient number of consecutive "Idle" intervals exist, subroutine 740 may maintain the normal operating mode (step 754).

Referring again to step 744, if the low power mode is currently active, subroutine 740 may involve determining whether the current time interval has been recorded or marked as "Busy" (step 746). Step 746 may include retrieving a pre-defined power conservation schedule from memory and comparing the current time interval (e.g., an interval number, sequence indicator, etc.) with the power conservation schedule. If the current hour is marked as "Busy," subroutine 740 may involve activating the normal operating mode (step 750). If the current hour is marked as "Idle" (i.e., not marked "Busy"), subroutine 740 may maintain the low power mode (step 752). In some embodiments, the low power mode may remain active until the beginning of a new time interval (e.g., a new hour). In other embodiments, the normal mode may be activated within a time interval if user activity is detected (step 754).

Referring again to steps 750, 752, and 754, upon the beginning of a new time interval (e.g., a new hour) subroutine 740 may involve determining whether any user activity has occurred during the previous time interval (e.g., the previous hour) (step 756). If user activity has occurred, the previous time interval may be recorded or marked as "Busy" (step 758). If user activity has not occurred, the previous time interval may be marked as "Idle" (step 760).

In some embodiments, subroutine 740 may repeat indefinitely or until deactivated. For example, upon reaching the end of the last time interval of a power conservation schedule, the current schedule activity data (e.g., the "Busy" or "Idle" data recorded during steps 758 and 760) may be used to set a new schedule for the upcoming schedule period. Advantageously, the activity data used to set a new schedule may be recorded while implementing a previously-set schedule. This concurrent operation (e.g., activity monitoring, recording, and schedule implementation) may allow subroutine 740 to repeat as desired without requiring additional learning phases.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A plumbing fixture comprising:
  a basin;
  a plumbing system configured to supply water to the basin;
  a processing circuit comprising a digital media interface; and
  a housing containing the plumbing system and the processing circuit, the housing comprising a rear face having a section extending therefrom, the section comprising a first face parallel to the rear face and a second face connecting the first face to the rear face, wherein the second face comprises ports allowing access to the digital media interface.

2. The plumbing fixture of claim 1, further comprising a speaker within the housing;
  wherein the housing comprises a speaker opening configured to allow sound emitted from the speaker to exit the housing;
  wherein the processing circuit is configured to receive a signal from an audio source and control a sound emitted by the speaker based on the signal.

3. The plumbing fixture of claim 2, wherein the audio source comprises at least one of a radio receiver, a memory card reader, an auxiliary input, a USB connection, a wired networking device, a Bluetooth device, and an IEEE 802.11 compliant device.

4. The plumbing fixture of claim 2, further comprising:
  a remote receiver coupled to the processing circuit; and
  a user-operable remote controller configured to communicate with the remote receiver;
  wherein the processing circuit is configured to control the sound emitted by the speaker based on input received from the remote controller.

5. The plumbing fixture of claim 4, wherein the user-operable remote controller comprises:
  an electronic display;
  a user input device; and
  a second processing circuit configured to cause the electronic display to display a first user interface comprising a plurality of selectable audio sources;
  wherein the second processing circuit is configured to receive an input indicative of a user-selected audio source via the user input device, and transmit a signal to the remote receiver based on the input received via the user input device.

6. The plumbing fixture of claim 5, wherein the second processing circuit is configured to cause the electronic display to display a second user interface permitting deselection of one or more of the plurality of selectable audio sources;
  wherein deselecting an audio source via the second user interface prevents the deselected audio source from being displayed in the first user interface.

7. The plumbing fixture of claim 1, further comprising a removable battery pack accessibly located within the housing and configured to provide power to the plumbing fixture when a primary power source is not providing power to the plumbing fixture.

8. The plumbing fixture of claim 1, further comprising a sensor and a speaker;
  wherein the processing circuit is configured to determine that a user is approaching the plumbing fixture based on a signal from the sensor;

wherein the processing circuit is configured to cause the speaker to play music in response to the determination that the user is approaching the plumbing fixture.

9. The plumbing fixture of claim 1, further comprising:
a lid and a seat, both of which are independently and automatically movable, without force provided by a user, between an open position and a closed position;
a front sensor; and
a side sensor,
wherein the processing circuit is configured to receive an input specifying whether to use the front sensor or the side sensor for initiating movement of the lid or the seat between the open position and the closed position.

10. The plumbing fixture of claim 9, wherein the processing circuit stores configuration settings specifying whether to initiate movement of the lid, the seat, or both the lid and the seat when a user is detected by the side sensor.

11. The plumbing fixture of claim 9, wherein the processing circuit stores a detection distance and is configured to initiate movement of the lid, the seat, or both the lid and the seat between the open position and the closed position when a user is detected by the front sensor at the detection distance.

12. A method for automatically configuring a power conservation schedule for an electronic plumbing fixture, the method comprising:
collecting user activity data over a cyclical period comprising a plurality of discrete time intervals;
marking each time interval with a first designation if user activity occurs during the time interval and with a second designation if user activity does not occur during the time interval;
receiving a minimum threshold;
scheduling the plumbing fixture to enter a power conservation mode during a time interval if (a) the time interval is part of a group of consecutive time intervals marked with the second designation and (b) the group includes a number of time intervals greater than or equal to the minimum threshold; and
scheduling the plumbing fixture to enter a normal mode of operation during all other time intervals.

13. The method of claim 12, further comprising entering the normal mode of operation during a time interval for which the power conservation mode was scheduled upon detecting user activity during the time interval.

14. The method of claim 13, wherein user activity comprises at least one of operating a control panel of the plumbing fixture, operating a remote controller configured to control the plumbing fixture, inserting a memory card into a memory card reader of the plumbing fixture, activating a proximity sensor of the plumbing fixture, flushing the plumbing fixture, operating a bidet of the plumbing fixture, operating a cleaning process of the plumbing fixture, and playing music from a speaker of the plumbing fixture.

15. The method of claim 12, further comprising automatically configuring the power conservation schedule based at least one of a frequency with which the plumbing fixture is used, an identifier of a feature or features of the plumbing fixture used during each use, an identifier of a user profile which is active during each use, and a length of each use.

16. A plumbing fixture comprising:
a basin;
a plumbing system configured to supply water to the basin;
a lighting element capable of emitting light having a variety of different colors;
a processing circuit configured to control the color of the emitted light; and
a housing containing the plumbing system, the processing circuit, and the lighting element, the housing comprising a translucent portion arranged such that the emitted light at least partially exits the housing via the translucent portion.

17. The plumbing fixture of claim 16, further comprising an input device comprising at least one of a control panel on the plumbing fixture, a proximity sensor, and a remote receiver;
wherein the processing circuit is configured to control the color of the emitted light based on a signal received from the input device.

18. The plumbing fixture of claim 16, further comprising a remote receiver configured to communicate with a user-operable remote controller;
wherein the processing circuit is configured to control the color of the emitted light based on input received from a user via the remote controller.

19. The plumbing fixture of claim 16, further comprising a sensor;
wherein the processing circuit is configured to determine that a user is approaching the plumbing fixture based on a signal from the sensor;
wherein the processing circuit is configured to activate the lighting element in response to the determination that the user is approaching the plumbing fixture.

20. The plumbing fixture of claim 16, wherein the processing circuit stores configuration settings comprising a lighting schedule and is configured to control the lighting element according to the lighting schedule.

* * * * *